United States Patent
Rahman et al.

(10) Patent No.: US 10,827,427 B2
(45) Date of Patent: Nov. 3, 2020

(54) ON/OFF TIME MASK FOR SHORT TTI

(71) Applicant: TELEFONAKTIEBOLAGET L M ERICSSON (PUBL), Stockholm (SE)

(72) Inventors: Imadur Rahman, Sollentuna (SE); Muhammad Kazmi, Sundbyberg (SE); Christian Bergljung, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 8 days.

(21) Appl. No.: 16/317,164

(22) PCT Filed: Nov. 3, 2017

(86) PCT No.: PCT/IB2017/056890
§ 371 (c)(1),
(2) Date: Jan. 11, 2019

(87) PCT Pub. No.: WO2018/083659
PCT Pub. Date: May 11, 2018

(65) Prior Publication Data
US 2019/0297572 A1    Sep. 26, 2019

Related U.S. Application Data

(60) Provisional application No. 62/417,729, filed on Nov. 4, 2016, provisional application No. 62/418,523, filed on Nov. 7, 2016.

(51) Int. Cl.
*H04W 52/02*    (2009.01)
*H04W 76/28*    (2018.01)
(Continued)

(52) U.S. Cl.
CPC ..... *H04W 52/0216* (2013.01); *H04W 52/146* (2013.01); *H04W 52/36* (2013.01);
(Continued)

(58) Field of Classification Search
CPC ......... H04W 52/0216; H04W 72/1268; H04W 52/36; H04W 52/146; H04W 76/28; H04W 72/1289
See application file for complete search history.

(56) References Cited

U.S. PATENT DOCUMENTS

2004/0038701 A1* 2/2004 Lin ...................... H03G 3/3047
455/522
2004/0218620 A1* 11/2004 Palm ..................... H04W 74/02
370/445
(Continued)

OTHER PUBLICATIONS

Ericsson, "Implication of sTTI operation on UL ON/OFF time mask", 3GPP TSG-RAN WG4 Meeting #81, R4-1610472, Nov. 14-18, 2016.
(Continued)

*Primary Examiner* — Thai Nguyen
(74) *Attorney, Agent, or Firm* — Withrow & Terranova, PLLC

(57) ABSTRACT

According to some embodiments, a method for use in a user equipment (UE) of transmitting wireless signals according to an ON/OFF time mask comprises: obtaining a transmission time interval (TTI) for operating a wireless signal between the UE and a cell; and determining an ON/OFF time mask from a plurality of ON/OFF time masks based on the obtained TTI. The ON/OFF time mask specifies a length and position of transient periods for power ramp up and ramp down with respect to an associated TTI. The method further comprises transmitting the wireless signal in the cell according to the determined ON/OFF time mask. For example, determining the ON/OFF time mask may comprise determining one ON/OFF time mask if a length of the obtained TTI is below a threshold, and determining a different ON/OFF time mask if the length of the obtained TTI is equal to or above the threshold.

36 Claims, 18 Drawing Sheets

(51) Int. Cl.
*H04W 52/14* (2009.01)
*H04W 52/36* (2009.01)
*H04W 72/12* (2009.01)

(52) U.S. Cl.
CPC ....... *H04W 72/1268* (2013.01); *H04W 76/28* (2018.02); *H04W 72/1289* (2013.01)

(56) References Cited

U.S. PATENT DOCUMENTS

2015/0031410 A1    1/2015   Lim et al.
2016/0150474 A1*   5/2016   Ang ................. H04W 52/0216
                                                                       370/311

OTHER PUBLICATIONS

Huawei et al., "Further discussion on UL ON/OFF time mask", 3GPP TSG RAN WG4 Meeting #82, R4-1701257, Feb. 13-17, 2017.
3GPP TS 36.101 v14.1.0 "3rd Generation Partnership Project; Technical Specification Group Radio Access Network; Evolved Universal Terrestrial Radio Access (E-UTRA); User Equipment (UE) radio transmission and reception (Release 14)" pp. 131-139, Oct. 12, 2016.

* cited by examiner

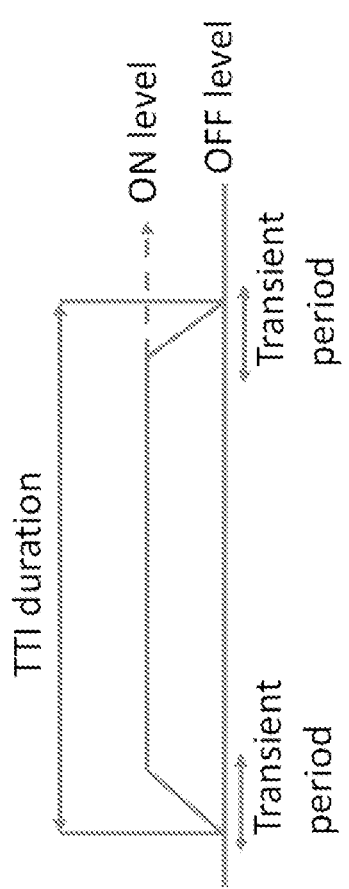
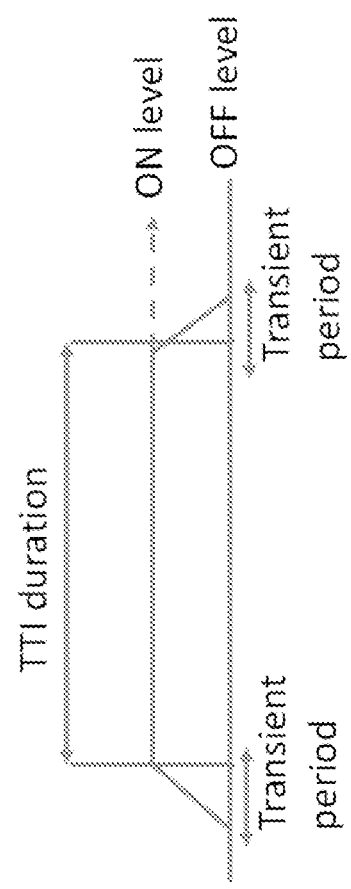
Fig. 10A
Fig. 10B

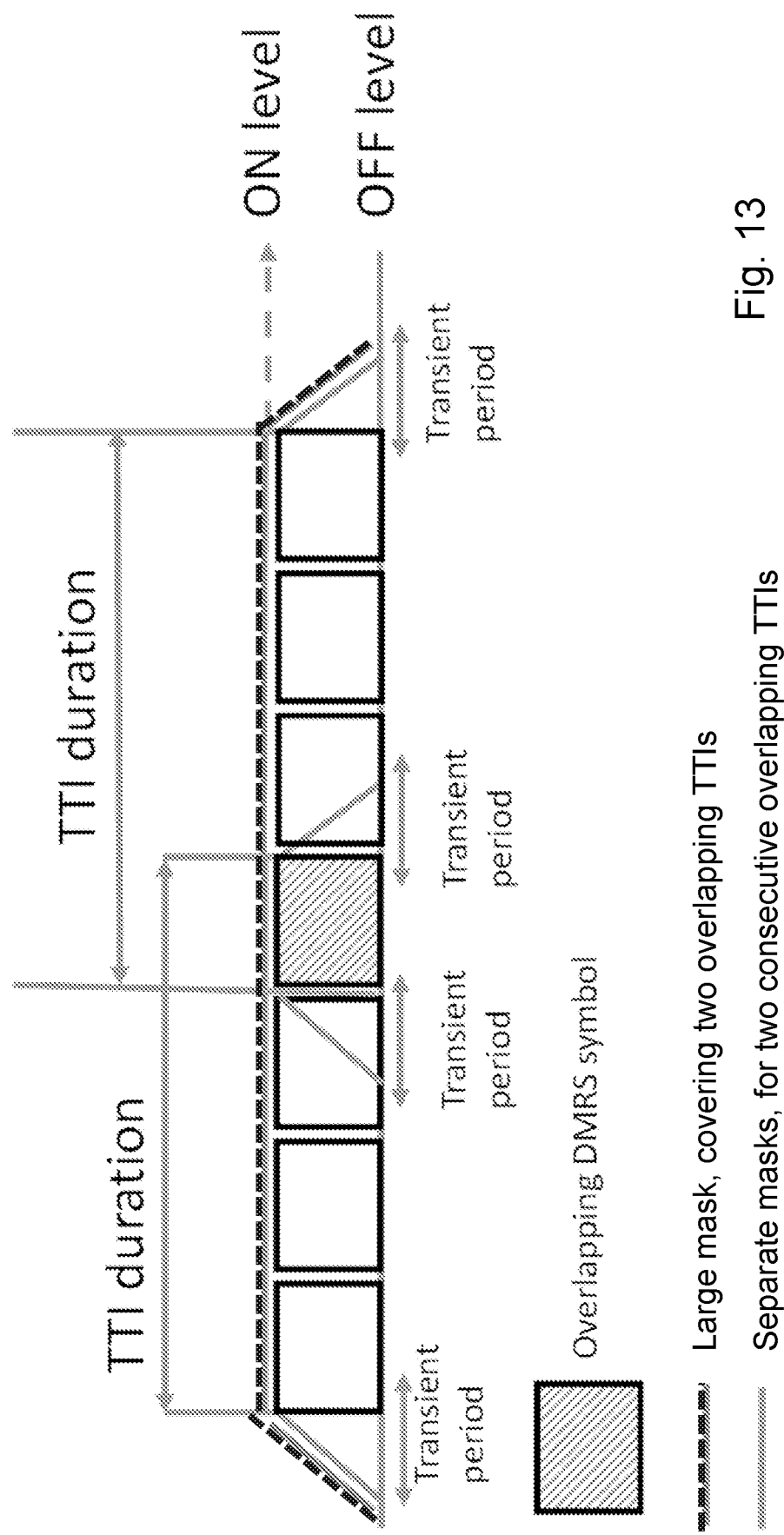

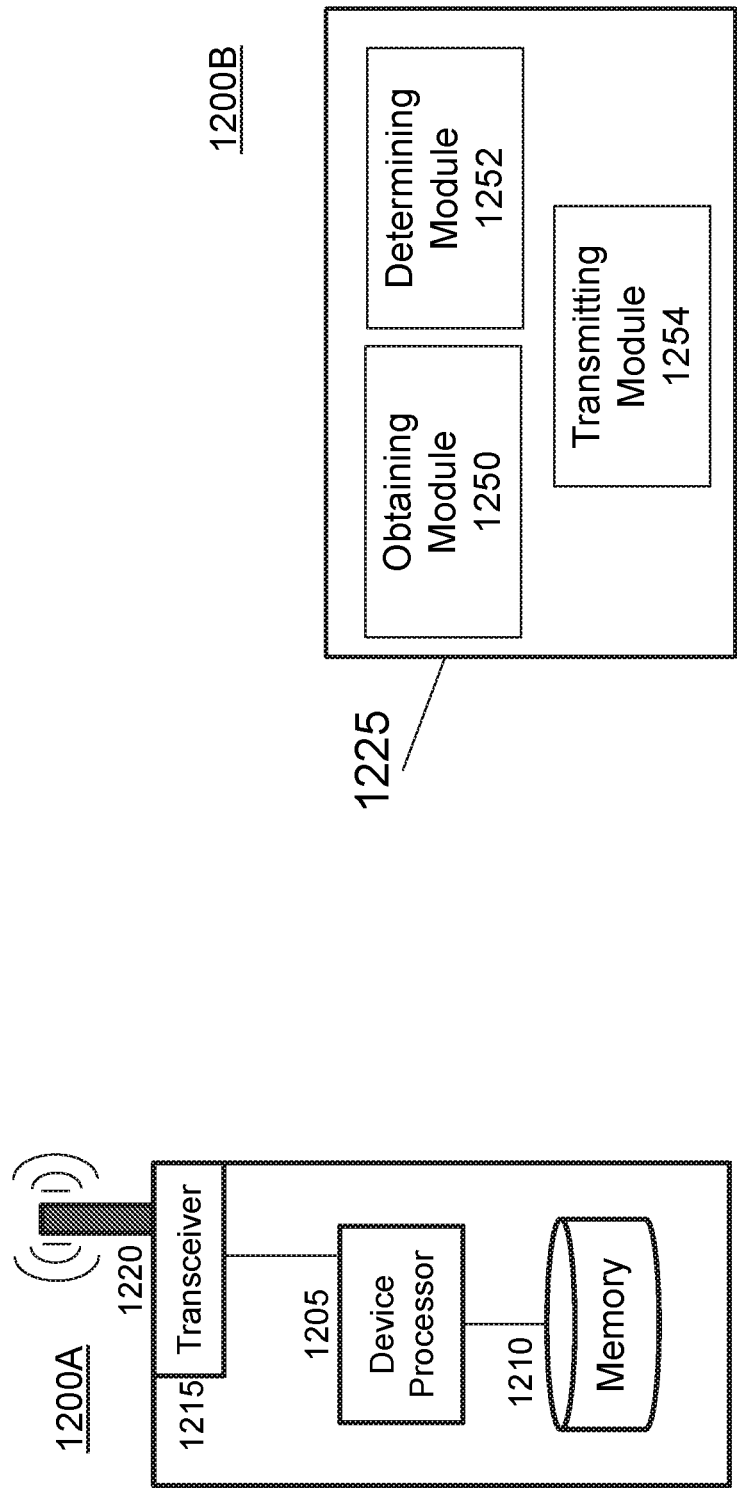

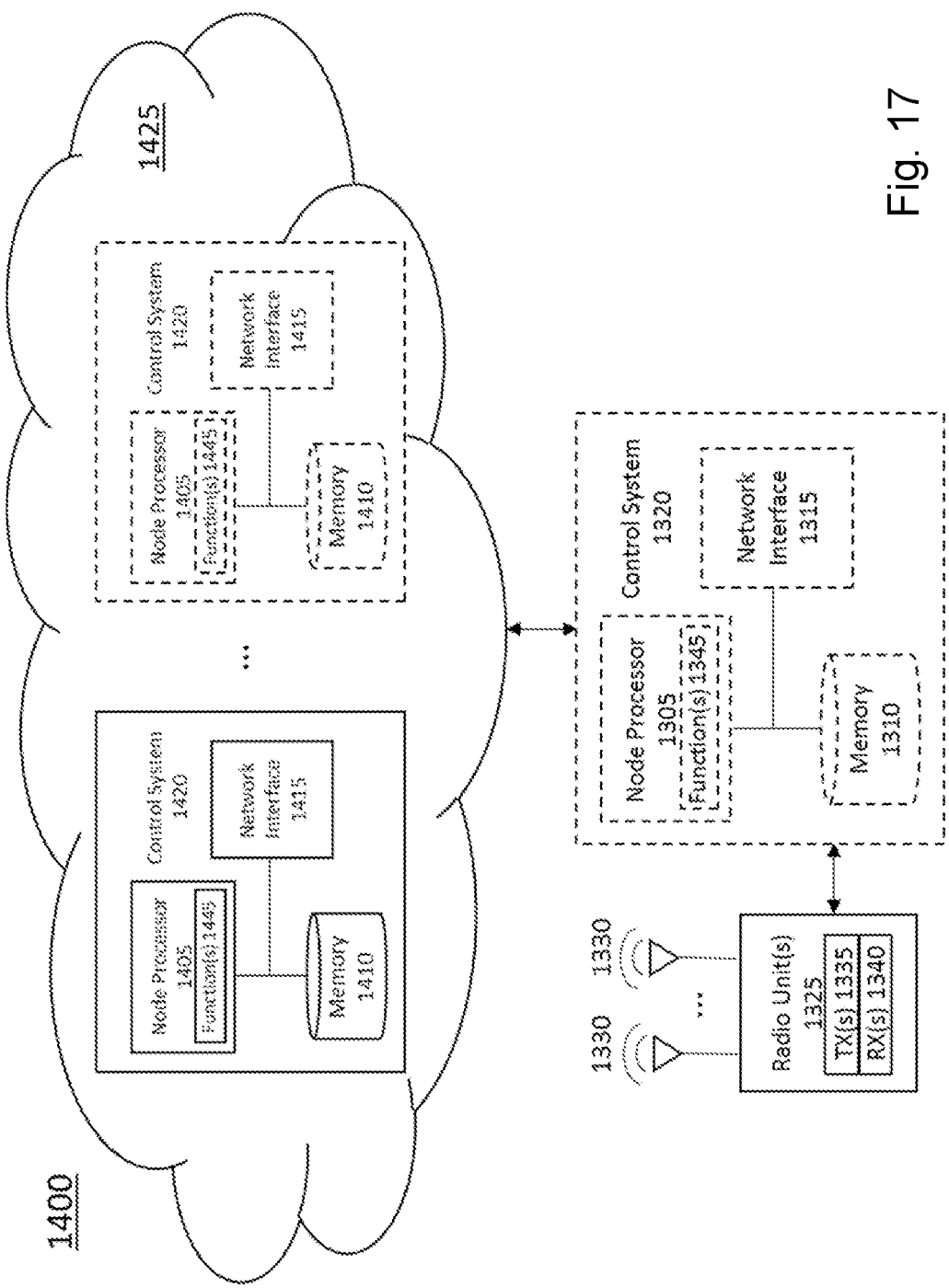

ON/OFF TIME MASK FOR SHORT TTI

RELATED APPLICATIONS

This application is a national stage application of International Patent Application No. PCT/IB2017/056890, filed Nov. 3, 2017, which claims the benefit of U.S. provisional patent application Ser. No. 62/417,729, filed Nov. 4, 2016, and U.S. provisional patent application Ser. No. 62/418,523, filed Nov. 7, 2016, the disclosures of which are hereby incorporated herein by reference in their entirety.

TECHNICAL FIELD

The disclosed subject matter relates generally to telecommunications. Certain embodiments of the disclosed subject matter relate more particularly to a shortened transmission time interval (sTTI), an ON/OFF mask and Carrier Aggregation (CA) for wireless communications.

INTRODUCTION

Third Generation Partnership Project (3GPP) Long Term Evolution (LTE) uses Orthogonal Frequency Division Multiplexing (OFDM) in the downlink, where each downlink symbol may be referred to as an OFDM symbol, and Discrete Fourier Transform (DFT)-spread OFDM in the uplink, where each uplink symbol may be referred to as a single-carrier-frequency-division multiple access (SC-FDMA) symbol. The basic LTE downlink physical resource comprises a time-frequency grid as illustrated in FIG. 1.

FIG. 1 illustrates an example downlink radio subframe. The horizontal axis represents time and the other axis represents frequency. Each resource element corresponds to one OFDM subcarrier during one OFDM symbol interval. In the time domain, LTE downlink transmissions may be organized into radio frames.

FIG. 2 illustrates an example radio frame. Each radio frame 10 is 10 ms and consists of ten equally-sized subframes of length Tsubframe=1 ms. For normal cyclic prefix, one subframe consists of 14 OFDM symbols. The duration of each symbol is approximately 71.4 µs.

Users are allocated a specific number of subcarriers for a predetermined amount of time. These are referred to as physical resource blocks (PRBs). PRBs thus have both a time and frequency dimension. A resource block corresponds to one slot (0.5 ms) in the time domain and 12 contiguous subcarriers in the frequency domain. A pair of two adjacent resource blocks in time direction (1.0 ms) is known as a resource block pair. The time interval may be referred to as transmission time interval (TTI).

Downlink transmissions are dynamically scheduled (i.e., in each subframe a base station transmits control information about to which terminals data is transmitted and upon which resource blocks the data is transmitted, for the current downlink subframe). The control signaling is typically transmitted in the first 1, 2, 3 or 4 OFDM symbols in each subframe and the number n=1, 2, 3 or 4 is known as the Control Format Indicator (CFI) indicated by the physical CFI channel (PCFICH) transmitted in the first symbol of the control region. The control region also contains physical downlink control channels (PDCCH) and possibly also physical HARQ indication channels (PHICH) carrying ACK/NACK for the uplink transmission.

The downlink subframe also contains common reference symbols (CRS), which are known to the receiver and used for coherent demodulation of, for example, control information. A downlink system with CFI=3 OFDM symbols as control is illustrated in FIG. 1. In a Rel-8 TTI, one such portion of the downlink transmission is referred to as one TTI.

Packet data latency is one of the performance metrics that vendors, operators and also end-users (via speed test applications) regularly measure. Latency measurements are done in all phases of a radio access network system lifetime, such as when verifying a new software release or system component, when deploying a system, and when the system is in commercial operation.

Shorter latency than previous generations of 3GPP RATs is one performance metric that guided the design of LTE. LTE is recognized by end-users to provide faster access to internet and lower data latencies than previous generations of mobile radio technologies.

Packet data latency is important not only for the perceived responsiveness of the system, it is also a parameter that indirectly influences the throughput of the system. HTTP/TCP is the dominating application and transport layer protocol suite used on the internet today. According to HTTP Archive (see httparchive.org under trends) the typical size of HTTP based transactions over the internet are in the range of a few 10s of Kbyte up to 1 Mbyte. In this size range, the TCP slow start period is a significant part of the total transport period of the packet stream. During TCP slow start the performance is latency limited. Hence, improved latency can rather easily be showed to improve the average throughput, for this type of TCP based data transactions.

Radio resource efficiency could be positively impacted by latency reductions. Lower packet data latency could increase the number of transmissions possible within a certain delay bound; hence higher Block Error Rate (BLER) targets could be used for the data transmissions freeing up radio resources potentially improving the capacity of the system.

One area to address when it comes to packet latency reductions is the reduction of transport time of data and control signaling by modifying the TTI length. In LTE release 8, a TTI corresponds to one subframe (SF) of length 1 millisecond. One such 1 ms TTI is constructed using 14 OFDM or SC-FDMA symbols in the case of normal cyclic prefix and 12 OFDM or SC-FDMA symbols in the case of extended cyclic prefix. LTE release 13 may specify transmissions with TTIs that are much shorter than the LTE release 8 TTI. The shorter TTIs may have any duration in time and comprise resources on a number of OFDM or SC-FDMA symbols within a 1 ms SF. As one example, the duration of the short TTI may be 0.5 ms (i.e., seven OFDM or SC-FDMA symbols for the case with normal cyclic prefix). As another example, the duration of the short TTI may be 2 symbols.

As seen in FIG. 1, the TTI length consists of 14 OFDM symbols. In case of shortened TTI, the TTI length can be reduced to 2-OFDM symbols, 4-OFDM symbols or 7-OFDM symbols. These are denoted as: 2-OS sTTI, 4-OS sTTI, 7-OS sTTI, respectively. OFDM symbol herein can also be SC-FDMA symbol or any type of symbol.

The shortened TTI can be used in different values in different direction, such as downlink and uplink. For example: a downlink may use 2-OS sTTI, while uplink may use 4-OS sTTI in the same cell.

Different frame structures, such as FS1, FS2 and FS3, may use different length sTTI. The time domain structure in FIG. 2 relates to FS1. 2-OS, 4OS and 7 OS TTI are usable for FS1. For FS2 which is used for TDD, 7-OS sTTI is one of the shortened TTI modes. Some example TTI durations are illustrated in FIGS. 3-5.

For example, particular networks may use a 7-symbol TTI in downlink. FIG. 3 illustrates an example of 7-symbol TTI. Each TTI includes 7 OFDM symbols 20. The illustrated sTTI structure may also be used for uplink.

Particular networks may use a 4-symbol TTI in downlink. FIG. 4 illustrates an example of 4-symbol TTI. Each TTI includes 4 OFDM symbols 20. The illustrated sTTI structure may also be used for uplink.

FIG. 5 illustrates examples of short TTI for uplink. The example in FIG. 5 shows various TTI lengths. The 2-OS sTTI can have one of the two illustrated options.

The following characteristics apply to uplink sTTI. Three different TTI lengths may be used for uplink. Of the three, different patterns are possible for 2OS TTI. A fast uplink grant may include dynamic indication of TTI length and/or dynamic indication of DMRS position. For some TTI patterns, shared DMRS is possible between UEs. For some UEs, this also means that the UE will send DMRS for two TTIs when the UE is scheduled across neighboring TTIs.

Short TTI may impact the ON/OFF time mask for a UE. TS 36.101, v14.1.0, Section 6.3.4, describes the time mask. The general ON/OFF time mask defines the observation period between Transmit OFF and ON power and between Transmit ON and OFF power. ON/OFF scenarios include: the beginning or end of DTX, measurement gap, contiguous, and non-contiguous transmission. The OFF power measurement period is defined in a duration of at least one sub-frame excluding any transient periods. The ON power is defined as the mean power over one sub-frame excluding any transient period. There are no additional requirements on UE transmit power beyond that which is required in subclause 6.2.2 and subclause 6.6.2.3.

FIG. 6 illustrates an example ON/OFF time mask. FIG. 6 is reproduced from TS 36.101, v14.1.0, Figure 6.3.4.1-1. The horizontal axis represents time and the vertical axis represent transmission power. As described above, the ON/OFF time mask is designed for 1 ms TTI in Rel-8 legacy LTE systems.

The duration of ramping of power (up or down) in the mask is shorter compared to the length of sub-frame or slot, but its position has an influence on system performance. The position in time of the ramping or transient period includes a few non-limiting possibilities. Some examples are illustrated in FIG. 7.

FIG. 7 illustrates three example positions in time for the power up and down transient periods. Position (a) illustrates ramping outside a timeslot/sub-frame. Position (b) illustrates ramping inside a time slot/sub-frame. Position (c) illustrates ramping partly inside and partly outside a timeslot/sub-frame.

SUMMARY

In some embodiments, a method in a user equipment (UE) operating in carrier aggregation mode generally includes the following steps. Step-1: Obtaining (based on pre-defined rule or receiving from a network node or another UE) or determining a first transmission time interval (TTI1) used for operating a first signal (S1) between a first cell (cell1) on a first carrier (F1) and the UE, and/or obtaining (based on pre-defined rule or receiving from a network node or another UE) or determining a second transmission time interval (TTI2) used for operating a second signal (S2) between (cell2) on a second carrier (F2) and the UE. Step-2: Determining a first type of ON/OFF time mask (mask1) associated with a first TTI1 and/or a second type of ON/OFF time mask (mask2) associated with a second TTI2 based on the determined values of TTI1 and TTI2. Step-3: Transmitting signals (S1 and/or S2) to cell1 and/or cell2, respectively, based on the determined ON/OFF time masks (mask1 and mask2).

In some embodiments, a method in a network node generally includes the following steps. Step-1: Configuring a UE with a first transmission time interval (TTI1) used for operating a first signal (S1) between a first cell (cell1) on a first carrier (F1) and/or the UE, and with a second transmission time interval (TTI2) used for operating a second signal (S2) on a second carrier (F2) between a second cell (cell2) and the UE. Step-2: Determining based on the determined values of TTI1 and TTI2, a first type of ON/OFF time mask (mask 1) for a first TTI1 is to be selected or to be used by the UE for transmitting uplink signals and/or a second type of ON/OFF time mask (mask2) for a second TTI2 is to be selected or to be used by the UE for transmitting uplink signals. Step-3: Receiving signal S1 in cell1 from the UE and/or signal S2 in cell2 based on the determined ON/OFF time masks. Step-4: Some embodiments may use the received signal and/or the determined masks for one or more operational tasks.

Certain embodiments are presented in recognition of shortcomings associated with conventional approaches, such as the following. In the current specifications, the ON/OFF time mask is defined for a 1 ms transmission time interval (TTI) duration. The transient period is defined as 20 μs, which is small compared to 1 ms TTI duration. However, with a shorter TTI length (e.g., 2-OS compared to 14-OS or 1 ms), the transient period may become significant compared to the TTI duration. The problem may become significant when a UE is allocated in two consecutive TTIs. In that case, the legacy mask may cause a large part of the TTI duration to be lost. Particular embodiments may enhance the operation related to the transmission of signals by a UE configured with the same or different TTIs on different serving cells in carrier aggregation.

According to some embodiments, a method for use in a UE of transmitting wireless signals according to an ON/OFF time mask comprises: obtaining a first TTI for operating a first wireless signal between the UE and a cell; and determining a first ON/OFF time mask from a plurality of ON/OFF time masks based on the obtained first TTI. The ON/OFF time mask specifies a length and position of transient periods for power ramp up and ramp down with respect to an associated TTI. The method further comprises transmitting the first wireless signal in the cell according to the determined first ON/OFF time mask.

In particular embodiments, the plurality of ON/OFF time masks includes any of the following ON/OFF time masks: an ON/OFF time mask with the ramp up and ramp down transient periods positioned in time within the associated TTI; an ON/OFF time mask with the ramp up and ramp down transient periods positioned in time outside of the associated TTI; an ON/OFF time mask with the ramp up transient period positioned in time within the associated TTI and the ramp down transient period positioned in time outside of the associated TTI; and an ON/OFF time mask with the ramp up transient period positioned in time outside of the associated TTI and the ramp down transient period positioned in time within the associated TTI. The associated TTI for each of the plurality of ON/OFF time masks may comprise a plurality of consecutive TTIs. The obtained first TTI may comprise at least one of an uplink TTI and a downlink TTI.

In particular embodiments, determining the first ON/OFF time mask may comprise determining one ON/OFF time mask if a length of the obtained TTI is below a threshold, and determining a different ON/OFF time mask if the length of the obtained TTI is equal to or above the threshold.

In particular embodiments, determining the first ON/OFF time mask comprises determining the ON/OFF time mask based on the obtained TTI and a signal type of a wireless signal. In some embodiments, the signal type comprise a signal type of the wireless signal to be transmitted. When the signal type of the wireless signal to be transmitted includes a reference signal, determining the ON/OFF time mask may comprise determining a ON/OFF time mask where the ramp up and ramp down transient periods are positioned in time within the associated TTI. When the signal type of the wireless signal to be transmitted includes user data, determining the ON/OFF time mask may comprise determining an ON/OFF time mask where the ramp up and ramp down transient periods are positioned in time outside of the associated TTI.

In particular embodiments, the signal type comprises a signal type of a wireless signal to be transmitted in an adjacent TTI. When the signal type of the wireless signal to be transmitted in an adjacent TTI includes a reference signal, determining the ON/OFF time mask may comprise determining a ON/OFF time mask where the ramp up and ramp down transient periods are positioned in time outside of the associated TTI. When the signal type of the wireless signal to be transmitted in an adjacent TTI includes user data, determining the ON/OFF time mask may comprise determining an ON/OFF time mask where the ramp up and ramp down transient periods are positioned in time within the associated TTI.

In particular embodiments, the method further comprises obtaining a second TTI for operating a second wireless signal between the UE and the cell; determining a second ON/OFF time mask from the plurality of ON/OFF time masks based on the obtained second TTI; and transmitting the second wireless signal in the cell according to the second determined ON/OFF time mask.

According to some embodiments, a UE is capable of transmitting wireless signals according to an ON/OFF time mask. The UE comprises a processor operable to: obtain a first TTI for operating a first wireless signal between the UE and a cell and determine a first ON/OFF time mask from a plurality of ON/OFF time masks based on the obtained first TTI. The ON/OFF time mask specifies a length and position of transient periods for power ramp up and ramp down with respect to an associated TTI. The processor is further operable to transmit the first wireless signal in the cell according to the determined first ON/OFF time mask.

In particular embodiments, the plurality of ON/OFF time masks includes any of the following ON/OFF time masks: an ON/OFF time mask with the ramp up and ramp down transient periods positioned in time within the associated TTI; an ON/OFF time mask with the ramp up and ramp down transient periods positioned in time outside of the associated TTI; an ON/OFF time mask with the ramp up transient period positioned in time within the associated TTI and the ramp down transient period positioned in time outside of the associated TTI; and an ON/OFF time mask with the ramp up transient period positioned in time outside of the associated TTI and the ramp down transient period positioned in time within the associated TTI. The associated TTI for each of the plurality of ON/OFF time masks may comprise a plurality of consecutive TTIs. The obtained first TTI may comprise at least one of an uplink TTI and a downlink TTI.

In particular embodiments, the processor is operable to determine the first ON/OFF time mask by determining one ON/OFF time mask if a length of the obtained TTI is below a threshold, and determining a different ON/OFF time mask if the length of the obtained TTI is equal to or above the threshold.

In particular embodiments, the processor is operable to determine the first ON/OFF time mask by determining the ON/OFF time mask based on the obtained TTI and a signal type of a wireless signal. In some embodiments, the signal type comprises a signal type of the wireless signal to be transmitted. When the signal type of the wireless signal to be transmitted includes a reference signal, the processor may be operable to determine the ON/OFF time mask by determining a ON/OFF time mask where the ramp up and ramp down transient periods are positioned in time within the associated TTI. When the signal type of the wireless signal to be transmitted includes user data, the processor may be operable to determine the ON/OFF time mask by determining an ON/OFF time mask where the ramp up and ramp down transient periods are positioned in time outside of the associated TTI.

In particular embodiments, the signal type comprises a signal type of a wireless signal to be transmitted in an adjacent TTI. When the signal type of the wireless signal to be transmitted in an adjacent TTI includes a reference signal, the processor may be operable to determine the ON/OFF time mask by determining a ON/OFF time mask where the ramp up and ramp down transient periods are positioned in time outside of the associated TTI. When the signal type of the wireless signal to be transmitted in an adjacent TTI includes user data, the processor may be operable to determine the ON/OFF time mask by determining an ON/OFF time mask where the ramp up and ramp down transient periods are positioned in time within the associated TTI.

In particular embodiments, the processor is further operable to: obtain a second TTI for operating a second wireless signal between the UE and the cell; determine a second ON/OFF time mask from the plurality of ON/OFF time masks based on the obtained second TTI; and transmit the second wireless signal in the cell according to the second determined ON/OFF time mask.

According to some embodiments, a method for use in a network node of receiving wireless signals from a UE according to a ON/OFF time mask comprises: configuring the UE with a first TTI for operating a first wireless signal between the UE and a cell; and determining a first ON/OFF time mask from a plurality of ON/OFF time masks based on the first TTI. The ON/OFF time mask specifies a length and position of transient periods for power ramp up and ramp down with respect to an associated TTI. The method further comprises receiving the first wireless signal from the UE according to the determined first ON/OFF time mask.

In particular embodiments, the plurality of ON/OFF time masks includes any of the following ON/OFF time masks: a ON/OFF time mask with the ramp up and ramp down transient periods positioned in time within the associated TTI; a ON/OFF time mask with the ramp up and ramp down transient periods positioned in time outside of the associated TTI; a ON/OFF time mask with the ramp up transient period positioned in time within the associated TTI and the ramp down transient period positioned in time outside of the associated TTI; and a ON/OFF time mask with the ramp up transient period positioned in time outside of the associated TTI and the ramp down transient period positioned in time within the associated TTI. The associated TTI for each of the plurality of ON/OFF time masks may comprise a plurality of consecutive TTIs. The configured first TTI may comprise at least one of an uplink TTI and a downlink TTI.

In particular embodiments, determining the first ON/OFF time mask comprises determining one ON/OFF time mask if a length of the obtained TTI is below a threshold, and determining a different ON/OFF time mask if the length of the obtained TTI is equal to or above the threshold.

In particular embodiments, determining the first ON/OFF time mask comprises determining the ON/OFF time mask based on the configured TTI and a signal type of a wireless signal. In some embodiments, the signal type comprises a signal type of the wireless signal to be received. When the signal type of the wireless signal to be received includes a reference signal, determining the ON/OFF time mask may comprise determining an ON/OFF time mask where the ramp up and ramp down transient periods are positioned in time within the associated TTI. When the signal type of the wireless signal to be received includes user data, determining the ON/OFF time mask may comprise determining an ON/OFF time mask where the ramp up and ramp down transient periods are positioned in time outside of the associated TTI.

In particular embodiments, the signal type comprises a signal type of a wireless signal to be received in an adjacent TTI. When the signal type of the wireless signal to be received in an adjacent TTI includes a reference signal, determining the ON/OFF time mask may comprise determining a ON/OFF time mask where the ramp up and ramp down transient periods are positioned in time outside of the associated TTI. When the signal type of the wireless signal to be received in an adjacent TTI includes user data, determining the ON/OFF time mask may comprise determining a ON/OFF time mask where the ramp up and ramp down transient periods are positioned in time within the associated TTI.

In particular embodiments, the method further comprises: configuring the UE with a second TTI for operating a wireless signal between the UE and a cell; determining a second ON/OFF time mask from the plurality of ON/OFF time masks based on the second TTI; and receiving the second wireless signal from the UE according to the determined second ON/OFF time mask.

According to some embodiments, a network node is capable of receiving wireless signals from a UE according to a ON/OFF time mask. The network node comprises a processor operable to: configure the UE with a first TTI for operating a first wireless signal between the UE and a cell; and determine a first ON/OFF time mask from a plurality of ON/OFF time masks based on the first TTI. The ON/OFF time mask specifies a length and position of transient periods for power ramp up and ramp down with respect to an associated TTI. The processor is further operable to receive the first wireless signal from the UE according to the determined first ON/OFF time mask.

In particular embodiments, the plurality of ON/OFF time masks includes any of the following ON/OFF time masks: a ON/OFF time mask with the ramp up and ramp down transient periods positioned in time within the associated TTI; a ON/OFF time mask with the ramp up and ramp down transient periods positioned in time outside of the associated TTI; a ON/OFF time mask with the ramp up transient period positioned in time within the associated TTI and the ramp down transient period positioned in time outside of the associated TTI; and a ON/OFF time mask with the ramp up transient period positioned in time outside of the associated TTI and the ramp down transient period positioned in time within the associated TTI. The associated TTI for each of the plurality of ON/OFF time masks may comprise a plurality of consecutive TTIs. The configured first TTI may comprise at least one of an uplink TTI and a downlink TTI.

In particular embodiments, the processor is operable to determine the first ON/OFF time mask by determining one ON/OFF time mask if a length of the obtained TTI is below a threshold, and determining a different ON/OFF time mask if the length of the obtained TTI is equal to or above the threshold. In some embodiments, the processor is operable to determine the first ON/OFF time mask by determining the ON/OFF time mask based on the configured TTI and a signal type of a wireless signal. The signal type may comprise a signal type of the wireless signal to be received. When the signal type of the wireless signal to be received includes a reference signal, the processor may be operable to determine the ON/OFF time mask by determining a ON/OFF time mask where the ramp up and ramp down transient periods are positioned in time within the associated TTI. When the signal type of the wireless signal to be received includes user data, the processor may be operable to determine the ON/OFF time mask by determining a ON/OFF time mask where the ramp up and ramp down transient periods are positioned in time outside of the associated TTI.

In particular embodiments, the signal type comprises a signal type of a wireless signal to be received in an adjacent TTI. When the signal type of the wireless signal to be received in an adjacent TTI includes a reference signal, the processor may be operable to determine the ON/OFF time mask by determining a ON/OFF time mask where the ramp up and ramp down transient periods are positioned in time outside of the associated TTI. When the signal type of the wireless signal to be received in an adjacent TTI includes user data, the processor may be operable to determine the ON/OFF time mask by determining a ON/OFF time mask where the ramp up and ramp down transient periods are positioned in time within the associated TTI.

In particular embodiments, the processor is further operable to: configure the UE with a second TTI for operating a wireless signal between the UE and a cell; determine a second ON/OFF time mask from the plurality of ON/OFF time masks based on the second TTI; and receive the second wireless signal from the UE according to the determined second ON/OFF time mask.

According to some embodiments, a UE is capable of transmitting wireless signals according to an ON/OFF time mask. The UE comprises a configuring module, a determining module and a receiving module. The obtaining module is operable to obtain a first TTI for operating a first wireless signal between the UE and a cell. The determining module is operable to determine a first ON/OFF time mask from a plurality of ON/OFF time masks based on the obtained first TTI. The ON/OFF time mask specifies a length and position of transient periods for power ramp up and ramp down with respect to an associated TTI. The transmitting module is operable to transmit the first wireless signal in the cell according to the determined first ON/OFF time mask.

According to some embodiments, a network node is capable of receiving wireless signals from a UE according to a ON/OFF time mask. The network node comprises a configuring module, a determining module, and a receiving module. The configuring module is operable to configure the UE with a first TTI for operating a first wireless signal between the UE and a cell. The determining module is operable to determine a first ON/OFF time mask from a plurality of ON/OFF time masks based on the first TTI. The ON/OFF time mask specifies a length and position of transient periods for power ramp up and ramp down with respect to an associated TTI. The receiving module is operable to receive the first wireless signal from the UE according to the determined first ON/OFF time mask.

Also disclosed is a computer program product. The computer program product comprises instructions stored on non-transient computer-readable media which, when executed by a processor, perform the steps of: obtaining a first TTI for operating a first wireless signal between the UE and a cell; determining a first ON/OFF time mask from a plurality of ON/OFF time masks based on the obtained first TTI; and transmitting the first wireless signal in the cell according to the determined first ON/OFF time mask.

Another computer program product comprises instructions stored on non-transient computer-readable media which, when executed by a processor, perform the steps of: configuring the UE with a first TTI for operating a first wireless signal between the UE and a cell; determining a first ON/OFF time mask from a plurality of ON/OFF time masks based on the first TTI; and receiving the first wireless signal from the UE according to the determined first ON/OFF time mask.

Certain embodiments may provide various benefits compared to conventional approaches, such as the following. The UE behavior with respect to ON/OFF time mask may be well defined for different TTI patterns. The UE behavior with respect to ON/OFF time mask may be well defined when different TTI patterns are used in consecutive TTIs and the UE may be allocated resources in these consecutive TTIs. The UE behavior with respect to ON/OFF time mask may be well defined when different TTI patterns are used in consecutive TTIs and the UE may be allocated overlapping resources in these consecutive TTIs (such as 4-OS TTI arrangements, as shown in FIG. 4). Certain embodiments may have none, some, or all of the recited advantages.

BRIEF DESCRIPTION OF THE DRAWINGS

For a more complete understanding of the embodiments and their features and advantages, reference is now made to the following description, taken in conjunction with the accompanying drawings, in which:

FIG. 10A is a timing diagram illustrating an ON/OFF time mask with the ramp up and ramp down transient periods positioned in time within the associated TTI, according to some embodiments;
FIG. 10B is a timing diagram illustrating an ON/OFF time mask with the ramp up and ramp down transient periods positioned in time outside of the associated TTI, according to some embodiments;
FIG. 13 is timing diagram illustrating an example of ON/OFF time masks used for overlapping consecutive TTIs, according to some embodiments;
FIG. 15A is a block diagram illustrating an example embodiment of a wireless communication device;
FIG. 15B is a block diagram illustrating example components of a wireless communication device;
FIG. 17 is a block diagram illustrating a virtualized example of a radio access node, according to some embodiments.

DETAILED DESCRIPTION

Figure 1:
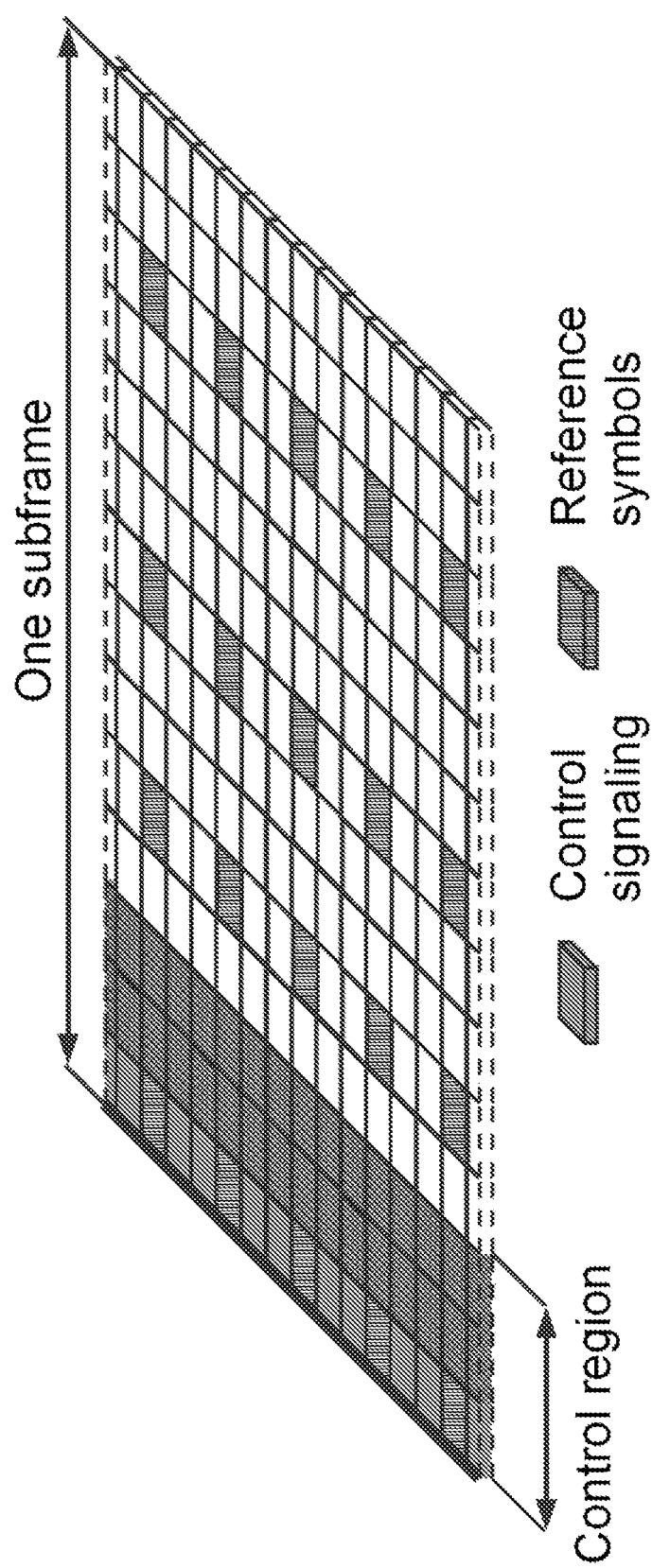
FIG. 1 illustrates an example downlink radio subframe.
Figure 2:
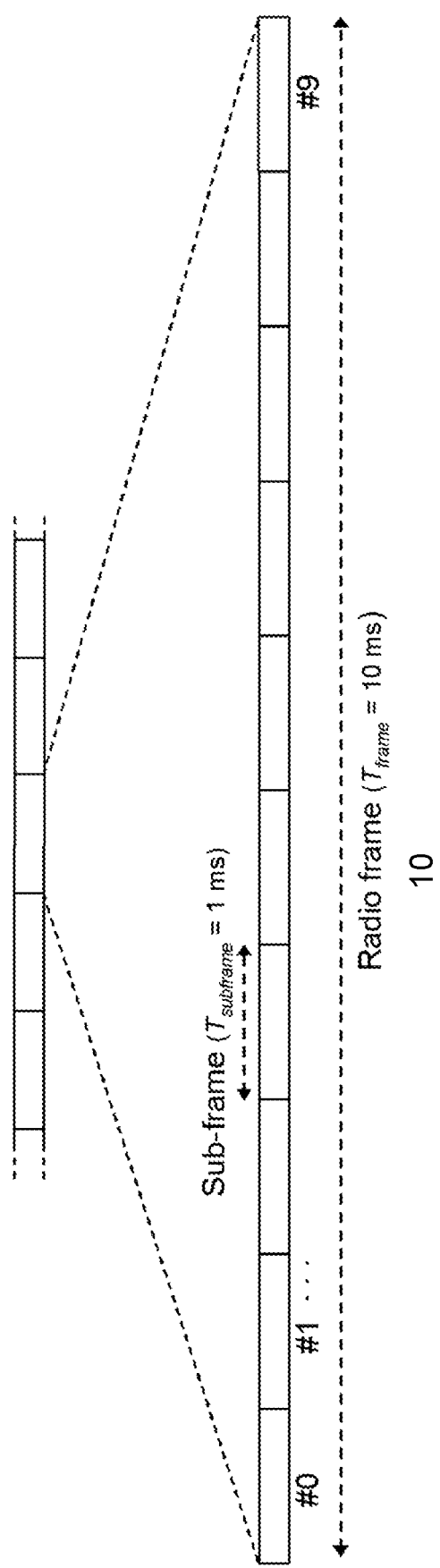
FIG. 2 illustrates an example radio frame.
Figure 3:
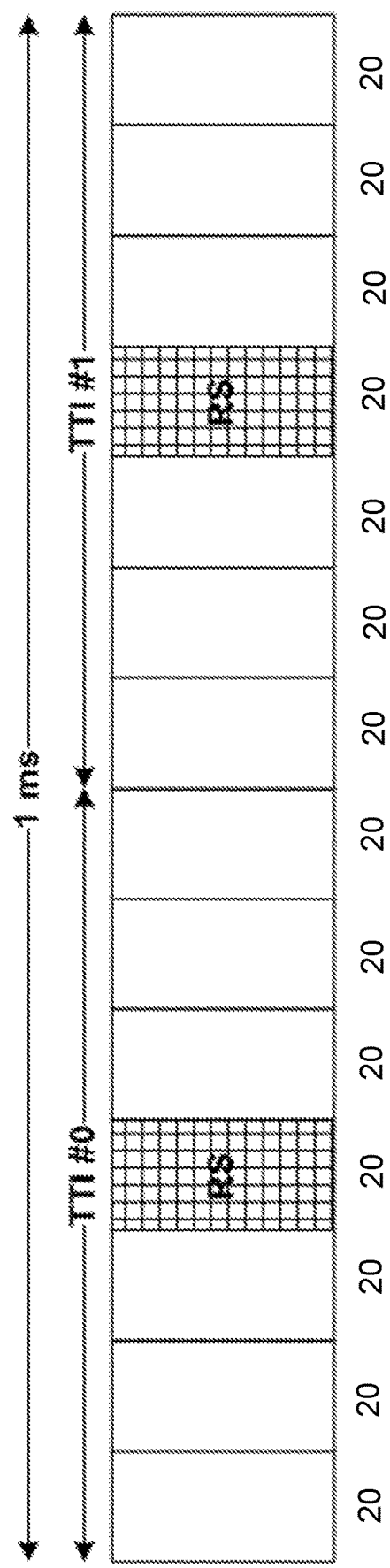
FIG. 3 illustrates an example of 7-symbol TTI.

For Third Generation Partnership Project (3GPP) Long Term Evolution (LTE), packet data latency is important not only for the perceived responsiveness of the system, it is also a parameter that indirectly influences the throughput of the system. Latency reductions may improve radio resource efficiency. One aspect of packet latency reduction is reduction of transport time of data and control signaling by modifying the transmission time interval (TTI) length. In older LTE releases, a TTI corresponds to one subframe (SF) of length 1 millisecond. Newer LTE releases may specify transmissions with TTIs that are shorter than 1 millisecond. For example, the duration of the short TTI may be 0.5 ms (i.e., seven orthogonal frequency division multiplexing (OFDM) or single carrier-frequency-division multiplexing (SC-FDMA) symbols for the case with normal cyclic prefix). As another example, the duration of the short TTI may be 2 symbols or 4 symbols.

In older LTE specifications, the ON/OFF time mask is defined for a 1 ms TTI duration. The transient period is defined as 20 µs, which is small compared to 1 ms TTI duration. With a shorter TTI length (e.g., 2-OS compared to 14-OS or 1 ms) in the newer LTE specifications, however, the transient period may become significant compared to the TTI duration. The problem may become significant when a user equipment (UE) is allocated in two consecutive TTIs. In that case, the legacy mask may cause a large part of the TTI duration to be lost. Particular embodiments may enhance the operation related to the transmission of signals by a UE configured with short TTIs.

According to some embodiments, a UE is capable of transmitting wireless signals according to an ON/OFF time mask. The ON/OFF time mask specifies a length and position of transient periods for power ramp up and ramp down with respect to an associated TTI. The UE is operable to obtain a TTI for operating a wireless signal between the UE and a cell. The UE determines a first ON/OFF time mask from a plurality of ON/OFF time masks based on the obtained TTI and transmits the wireless signal in the cell according to the determined ON/OFF time mask. A network node is capable of receiving wireless signals from the UE according to a ON/OFF time mask. The network node is operable to configure the UE with a TTI for operating a wireless signal between the UE and a cell. The network node determines a first ON/OFF time mask from a plurality of ON/OFF time masks based on the TTI, and receives the wireless signal from the UE according to the determined ON/OFF time mask.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the disclosed subject matter.

In the description that follows, terms such as "first node" and "second node" may be used to refer to two nodes that are either transmitting or receiving in licensed or unlicensed spectrum (or a shared spectrum where more than one system operates based on some kind of sharing regulations). An example of a first node includes a network node, which may be a general term that corresponds to any type of radio network node or any network node, which communicates with a UE and/or with another network node. Examples of network nodes include NodeB, base station (BS), multi-standard radio (MSR) radio node such as MSR BS, eNodeB, gNodeB. MeNB, SeNB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g., E-SMLC), MDT, etc.

Another example of a node includes a user equipment, this is a non-limiting term that refers to any type of wireless device communicating with a network node and/or with another UE in a cellular or mobile communication system. Examples of UE include target device, device to device (D2D) UE, machine type UE or UE capable of machine to machine (M2M) communication, PDA, iPAD, Tablet, mobile terminals, smart phone, laptop embedded equipped (LEE), laptop mounted equipment (LME), USB dongles, etc.

Some embodiments refer to generic terminology such as "radio network node" or simply "network node (NW node)," which may be any kind of network node such as a base station, radio base station, base transceiver station, base station controller, network controller, evolved Node B (eNB), Node B, relay node, access point, radio access point, Remote Radio Unit (RRU) Remote Radio Head (RRH), etc.

In this description, any of the above mentioned nodes could become "the first node" and/or "the second node".

A UE may be configured to operate in carrier aggregation (CA), which includes aggregation of two or more carriers in at least one of the downlink and uplink directions. With CA, a UE can have multiple serving cells, wherein the term "serving" herein means that the UE is configured with the corresponding serving cell and may receive from and/or transmit data to the network node on the serving cell (e.g., on PCell or any of the SCells). The data is transmitted or received via physical channels (e.g., PDSCH in downlink, PUSCH in uplink, etc.).

A component carrier (CC), also referred to as a carrier, primary component carrier (PCC), or secondary component carrier (SCC) may be configured at the UE by a network node using higher layer signaling (e.g., by sending a radio resource control (RRC) configuration message to the UE). The configured CC is used by the network node for serving the UE on the serving cell (e.g., on PCell, PSCell, SCell, etc.) of the configured CC. The configured CC is also used by the UE for performing one or more radio measurements (e.g., RSRP, RSRQ, etc.) on the cells operating on the CC (e.g., PCell, SCell or PSCell and neighboring cells).

The term "fallback mode" refers herein to a CA configuration which contains fewer CCs than the maximum number of CCs in a CA combination supported by the UE. For example, a UE supporting a CA combination with a maximum CA configuration of four downlink CCs and one uplink CC may support the following three fallback modes: three downlink CCs and one uplink CC, two downlink CC and one uplink CC, and one downlink CC and one uplink CC (i.e., single carrier operation). The term fallback may also be referred to as lower order CA combination, lower order CA configuration, fallback CA mode, fallback CA configuration mode, or fallback CA combination.

The term radio access technology, or RAT, may refer to any RAT, such as UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term "signal" used herein may be any physical signal or physical channel Examples of physical signals are reference signal such as PSS, SSS, CRS, PRS, etc. The term "physical channel" (e.g., in the context of channel reception) used herein is also referred to as "channel" Examples of physical channels include MIB, PBCH, NPBCH, PDCCH, PDSCH, sPUCCH, sPDSCH. sPUCCH. sPUSCH, MPDCCH, NPDCCH, NPDSCH, E-PDCCH, PUSCH, PUCCH, NPUSCH, etc.

The term "time resource" used herein may correspond to any type of physical resource or radio resource expressed in terms of length of time. Examples of time resources include: symbol, time slot, subframe, radio frame, TTI, interleaving time, etc.

The term "TTI" used herein may correspond to any time period (TO) over which a physical channel can be encoded and optionally interleaved for transmission. The physical channel is decoded by the receiver over the same time period (TO) over which it was encoded. The TTI may also interchangeably called as short TTI (sTTI), transmission time, slot, sub-slot, mini-slot, short subframe (SSF), mini-subframe, etc.

The term "radio measurement" used herein may refer to any measurement based on receiving a radio signal or channel, e.g., power-based measurements such as received signal strength (e.g., RSRP or CSI-RSRP) or quality measurements (e.g., RSRQ, RS-SINR, SINR, Es/Iot, SNR); cell identification; synchronization signals measurements; angle measurements such as angle of arrival (AOA); timing measurements such as Rx-Tx, RTT, RSTD, TOA, TDOA, timing advance; throughput measurements; channel quality measurements such CSI, CQI, PMI, channel measurement (e.g., MIB, SIBs, SI, CGI acquisitions, etc.). A measurement may be absolute, relative to a common reference or to another measurement, composite measurement, etc. A measurement may be on one link or more than one link (e.g., RSTD, timing advance, RTT, relative RSRP, etc.). Measurements may also be differentiated by purpose and may be performed for one or more purposes, e.g., for one or more of: RRM, MDT, SON, positioning, timing control or timing advance, synchronization. In a non-limiting example, particular embodiments may apply to any measurement such as described above. Herein, the term "radio measurement" may be used in a broader sense, e.g., receiving a channel (e.g., receiving system information via broadcast or multicast channel).

The term "requirements" used herein may include any type of UE requirements related to UE measurements, such as measurement requirements, RRM requirements, mobility requirements, positioning measurement requirements, etc. Examples of UE requirements related to UE measurements are measurement time, measurement reporting time or delay, measurement accuracy (e.g., RSRP/RSRQ accuracy), number of cells to be measured over the measurement time, etc. Examples of measurement time include L1 measurement period, cell identification time or cell search delay, CGI acquisition delay, etc.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Particular embodiments are described with reference to FIGS. 8-17 of the drawings, like numerals being used for like and corresponding parts of the various drawings. LTE and NR are used throughout this disclosure as example cellular systems, but the ideas presented herein may apply to other wireless communication systems as well.

The described embodiments may be implemented in any appropriate type of communication system supporting any suitable communication standards and using any suitable components. As one example, certain embodiments may be implemented in a communication system, such as that illustrated in FIG. 8. Although reference may be made to the term "cell," the described concepts may also apply in other contexts, such as beams used in Fifth Generation (5G) systems, for example.

Figure 8:
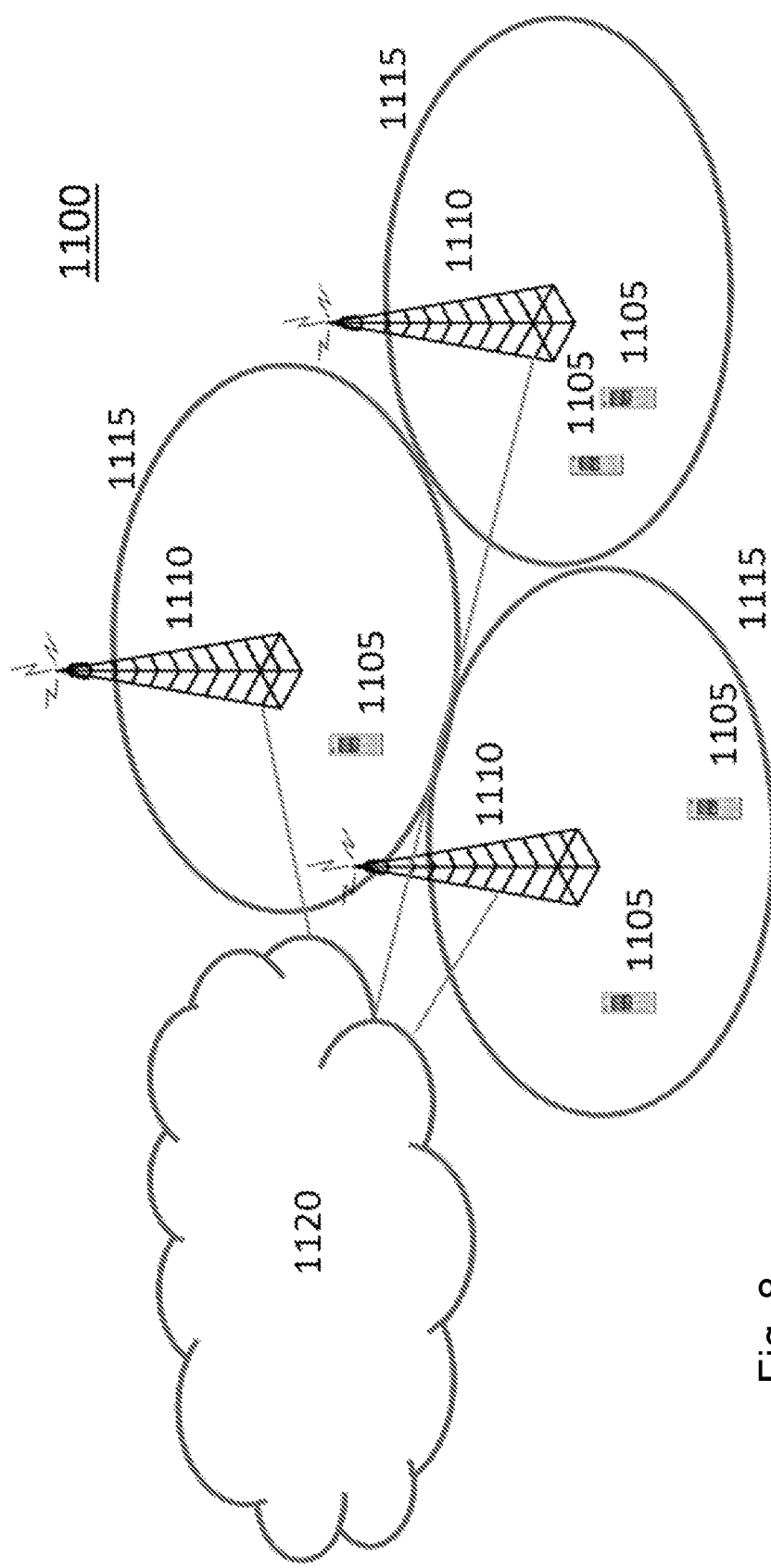
FIG. 8 is a block diagram illustrating an example wireless network, according to a particular embodiment.

FIG. 8 is a block diagram illustrating an example wireless network, according to a particular embodiment. Communication system 1100 comprises a plurality of wireless communication devices 1105 (e.g., UEs, machine type communication (MTC)/machine-to-machine (M2M) UEs) and a plurality of radio access nodes 1110 (e.g., eNodeBs, gNodeBs, or other base stations). Communication system 1100 is organized into cells 1115, which are connected to a core network 1120 via corresponding radio access nodes 1110. Radio access nodes 1110 are capable of communicating with wireless communication devices 105 along with any additional elements suitable to support communication between wireless communication devices or between a wireless communication device and another communication device (such as a landline telephone).

In general, wireless communication devices 1105 that are within coverage of radio access node 1110 (e.g., within cell 1115 served by radio access node 1110) communicate with radio access node 1110 by transmitting and receiving wireless signals. For example, wireless communication devices 1105 and radio access node 1110 may communicate wireless signals containing voice traffic, data traffic (e.g., broadcast video), and/or control signals. A radio access node 1110 communicating voice traffic, data traffic, and/or control signals to wireless communication device 1105 may be referred to as a serving network node 1110 for wireless communication device 1105. Wireless signals may include both downlink transmissions (from radio access node 1110 to wireless communication devices 1105) and uplink transmissions (from wireless communication devices 1105 to radio access node 1110).

In some embodiments, wireless communication device 1105 may be referred to by the non-limiting term "UE." A UE may include any type of wireless device capable of communicating with a network node or another UE over radio signals. The UE may comprise radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc.

In some embodiments, radio access node 1110 may include any type of network node such as a base station, radio base station, base transceiver station, base station controller, network controller, evolved Node B (eNB), gNB, Node B, multi-RAT base station, Multi-cell/multicast Coordination Entity (MCE), relay node, access point, radio access point, Remote Radio Unit (RRU) Remote Radio Head (RRH), a core network node (e.g., MME, SON node, a coordinating node, etc.), or even an external node (e.g., 3rd party node, a node external to the current network), etc.

Communication system 1100 may include various length TTI (e.g., TTI of 1 ms, or short TTI of 2-os, 4-os, 7-os, etc., or any combination). In particular embodiments, communication system 1100 may include different TTI in the downlink and uplink.

Wireless communication device 1105 may transmit wireless signals according to an ON/OFF time mask. Wireless communication device 1105 may obtain a TTI for operating a wireless signal between wireless communication device 1105 and cell 115, and determine an ON/OFF time mask from a plurality of ON/OFF time masks based on the obtained TTI. The ON/OFF time mask specifies a length and position of transient periods for power ramp up and ramp down with respect to an associated TTI. Wireless communication device 1105 is operable to transmit the wireless signal in cell 1115 according to the determined ON/OFF time mask. Additional details are described in more depth below.

Radio access node 1110 may receive wireless signals from wireless communication device 1105 according to a ON/OFF time mask. Radio access node 1110 may configure wireless communication device 1105 with a TTI for operating a wireless signal between wireless communication device 1105 and cell 1115, and determine an ON/OFF time mask from a plurality of ON/OFF time masks based on the TTI. Radio access node 1110 may receive the first wireless signal from wireless communication device 1105 according to the determined first ON/OFF time mask. Additional details are described in more depth below.

Communication system 1100 may include carrier aggregation. For example, wireless communication device 1105 may be served by both two or more radio access nodes 1110 and communicate wireless signals with two or more radio access nodes 1110.

Each radio access node 1110 may have a single transmitter or multiple transmitters for transmitting wireless signals to wireless communication device 1105. In some embodiments, radio access node 1110 may comprise a multi-input multi-output (MIMO) system. Similarly, each wireless communication device 1105 may have a single receiver or multiple receivers for receiving signals from radio access nodes 1110.

In communication system 1100, each radio access node 1110 may use any suitable radio access technology, such as long term evolution (LTE), LTE-Advanced, NR, UMTS, HSPA, GSM, cdma2000, WiMax, WiFi, and/or other suitable radio access technology. Communication system 1100 may include any suitable combination of one or more radio access technologies. For purposes of example, various embodiments may be described within the context of certain radio access technologies. However, the scope of the disclosure is not limited to the examples and other embodiments could use different radio access technologies.

Although wireless communication devices 1105 may represent communication devices that include any suitable combination of hardware and/or software, these wireless communication devices may, in certain embodiments, represent devices such as those illustrated in greater detail by FIGS. 15A and 15B. Similarly, although the illustrated radio access node may represent network nodes that include any suitable combination of hardware and/or software, these nodes may, in particular embodiments, represent devices such those illustrated in greater detail by FIGS. 16A, 16B and 17.

In the description of certain embodiments, two cells (or two TTIs or two carriers) are mentioned in several places when carrier aggregation is considered. The relevant embodiments are applicable to a carrier aggregation combination involving more than two TTIs (or cells or carriers), unless otherwise mentioned. The carriers can be inter-band, or intra-band, or mixture of intra- and inter-band carriers.

Among other things, the following includes a description of scenarios involving different TTI patterns, methods in a UE of determining ON/OFF time mask when different TTI patterns can be used for one UE in the same cell, and methods in a network node of determining ON/OFF time mask when different TTI patterns can be used for one UE in the same cell.

Some scenarios involving different TTI patterns include the following. One scenario includes a UE configured with at least one serving cell (e.g., PCell), also referred to as single carrier operation. The UE is capable of using at least two different TTIs (e.g., TTI of 1 ms and TTI of 2-OS, etc.). The UE can be configured with any one of the plurality of TTIs supported by the UE in one time resource in the serving cell. The UE may further be capable of supporting operation whereby the TTI is changed over time in the serving cell. The UE also be capable of supporting operation using different TTI in uplink and downlink of the serving cell. Example of some scenarios are described in Table 1 below.

TABLE 1

Example TTI Patterns

| No. | Cases | Examples of TTI patterns |
|---|---|---|
| 1 | Same TTI pattern is used in a cell continuously | TTI = 2-OS is used in all time resources in cell1 |
| 2 | Different TTI patterns are used in a cell in different time resources | TTI = 2-OS and TTI = 1 ms are used in different resources in cell1. |
| 3 | Different TTI patterns are used in the UL and DL of the same cell | TTI = 2-OS is used in DL of cell1 and TTI = 7-OS is used in UL of cell1 |
| 4 | Any combination of cases 2 and 3 | TTI = 2-OS and TTI = 7-OS are used in different resources in DL of cell1, whereas TTI = 7-OS is used in UL in all time resources in cell1. |

Some scenarios may include a UE configured with at least two serving cells (e.g., PCell and SCell, etc.), also referred to as carrier aggregation or multicarrier operation. The UE is capable of using at least two different TTIs (e.g., TTI of 1 ms and TTI of 2-OS, etc.). The UE can be configured with any one of the plurality of TTIs supported by the UE in different serving cells (e.g., TTI=1 for operation on both PCell and SCell or TTI=2-OS for operation on both PCell and SCell). The UE can also be configured with different TTIs in different serving cells (e.g., TTI=1 and TTI=7-OS for operation on PCell and SCell, respectively).

The UE may also support changing the TTI over time in one or more serving cells of the UE. The UE may operate using different TTI in uplink and downlink of any one or more of its serving cells. An example of some scenarios including multicarrier operation are described in Table 2 below.

TABLE 2

Example TTI Patterns for Multicarrier Operation

| Cases | Carrier combinations | Example (with two carriers, however not limited to two carriers) |
|---|---|---|
| Same TTI pattern is used in different UL carriers | More than one UL carriers in the aggregation | A cell Cell1 operating in frequency F1 uses a 1$^{st}$ TTI pattern in UL, while a cell Cell2 operating in frequency F2 uses the same TTI pattern in UL. A UE aggregates Cell1 and Cell2 in one UL CA configuration. |
| Different TTI patterns are used in UL different carriers | More than one UL carriers in the aggregation | A cell Cell1 operating in frequency F1 uses a 1$^{st}$ TTI pattern in UL, while a cell Cell2 operating in frequency F2 uses a 2$^{nd}$ TTI pattern in UL. A UE aggregates Cell1 and Cell2 in one UL CA configuration. |

A method in a user equipment includes the following general steps. Step-1: Obtaining (based on pre-defined rule or receiving from a network node or another UE) or determining a first TTI (TTI1) used for operating a first signal (S1) between a first cell (cell1) on a first carrier (F1) and the UE, and/or obtaining (based on pre-defined rule or receiving from a network node or another UE) or determining a second TTI (TTI2) used for operating a second signal (S2) between a second cell (cell2) on a second carrier (F2) and the UE. Step-2: Determining a first type of ON/OFF time mask (mask1) associated with a first TTI1 and/or a second type of ON/OFF time mask (mask2) associated with a second TTI2 based on the determined values of TTI1 and TTI2. Step-3: Transmitting signals (S1 and/or S2) to cell1 and/or cell2 respectively based on the determined ON/OFF time masks (mask1 and mask2). An example method is illustrated in FIG. 9.

Figure 9:
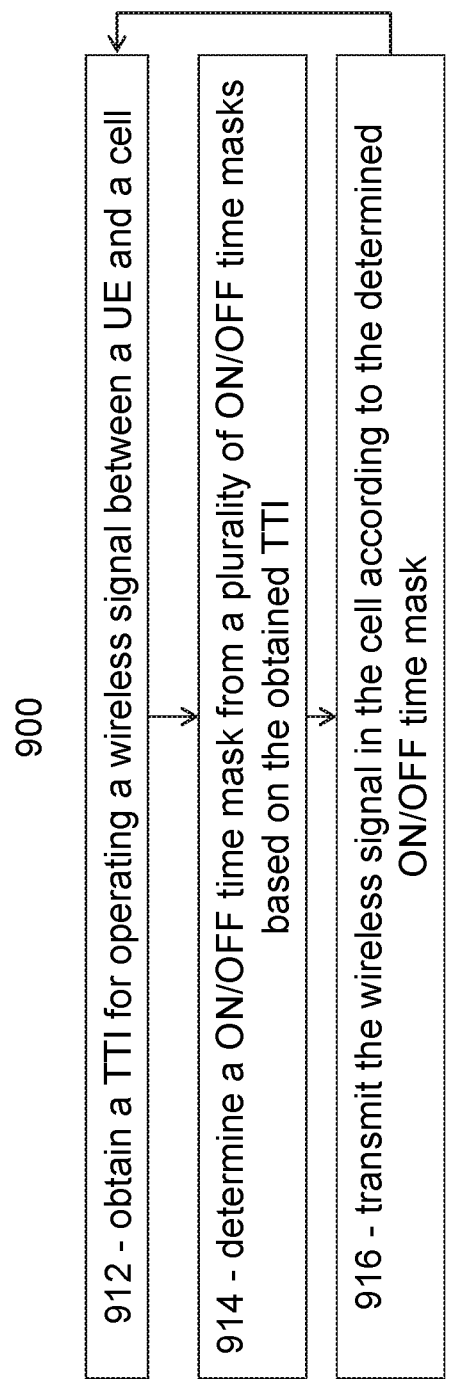
FIG. 9 is a flow diagram of an example method in a user equipment, according to some embodiments.

FIG. 9 is a flow diagram of an example method in a user equipment, according to some embodiments. The method includes transmitting wireless signals according to an ON/OFF time mask. In particular embodiments, one or more steps of method 900 may be performed by wireless communication device 1105 of communication system 1100 described with reference to FIG. 8.

In particular embodiments, the UE is configured with at least one serving cell in the uplink. The serving cell can be cell1 or cell2. In some embodiments, cell1 and cell2 can be the same in the case of a single serving cell. In some embodiments, cell1 and cell2 can be different in the case the case of two serving cells. For example, in some embodiments cell1 and cell2 may correspond to PCell and SCell respectively, or cell1 and cell2 may correspond to SCell and PCell respectively. For convenience, particular embodiments are described for the case when the UE selects between mask1 and mask2 based on the determined value of TTI1 or TTI2 used for operation in at least one serving cell (e.g., cell1). The embodiments, however, are applicable to selecting a mask out of any number of masks based on TTI.

The method begins at step 912, where the UE obtains a TTI for operating a wireless signal between a UE and a cell. For example, wireless communication device 1105 may obtain a TTI1 for transmitting and/or receiving wireless signals in cell 1115.

In particular embodiments, the UE obtains or determines a first TTI (TTI1) used for operating a first signal between a first cell on a first carrier and the UE. The first cell can be a serving cell of the UE (e.g., PCell, PSCell, SCell, etc.). The first cell may correspond to an uplink serving cell, in which case the TTI1 corresponds to the TTI of the uplink serving cell.

The phrase "operating signals" between the first cell and the UE herein include reception of signals by the UE from the first cell and/or transmission of signals by the UE to the first cell. Examples of signals received from the first cell at the UE include downlink channels (e.g., PDCCH, PDSCH, sPDCCH, sPDSCH, etc.). Examples of signals transmitted by the UE to the first cell include uplink channels (e.g., PUCCH, PUSCH, sPUCCH, sPUSCH, etc.).

In some embodiments, the UE may further obtain or determine a second TTI (TTI2) used for operating a second signal between a second cell on a second carrier and the UE. The second cell may include a serving cell of the UE (e.g., PCell, PSCell, etc.). The second cell may correspond to an uplink serving cell, in which case TTI2 corresponds to the TTI of the uplink serving cell.

In particular embodiments, the UE may determine TTI1 and/or TTI2 based on one or more of the following mechanisms. The UE may use pre-defined information (e.g., relation between TTI1 and frequency band of F1; and/or relation between TTI2 and frequency band of F2). The UE may use configuration received from the network node (e.g., PCell, SCell, SCell, etc.). For example, the UE may determine the TTI pattern used in any time instance in any carrier by receiving control signals in downlink or by receiving a RRC message.

In some embodiments, the UE may use a predefined rule. Examples of rules include the following. A UE may apply the same TTI as used in a reference cell. Examples of reference cell includes a PCell or a PSCell. A UE may determine the TTI based on a TTI used in the opposite direction of the first cell (and/or the second cell). For example, the UE may assume the same TTI in uplink and downlink of the first cell (and/or the second cell).

In some embodiments, the UE assumes uplink in the first cell uses a TTI that is not shorter than the TTI of the downlink of the first cell (and/or the second cell). The UE may use autonomous determination (e.g., the UE uses blind detection by attempting to decode a downlink channel of different pre-define TTIs).

Particular embodiments refer to obtaining a TTI for operating a first wireless signal between a UE and a cell. Carrier aggregation may include different TTIs for some cells of an aggregated group of cells. The ON/OFF mask, however, may be the same for some or all of the aggregated cells.

At step 914, the UE determines an ON/OFF time mask from a plurality of ON/OFF time masks based on the obtained TTI. For example, wireless communication device 1105 may determine an ON/OFF time mask from a plurality of ON/OFF time masked based on the TTI obtained in the previous step.

The ON/OFF time mask specifies a length and position of transient periods for power ramp up and ramp down with respect to an associated TTI. For particular masks, the duration of the ramp up period may be different than the duration of the ramp down period. An ON/OFF time mask may be described with respect to an associated TTI. The associated TTI may refer to a TTI type (e.g., a TTI associated with a particular duration, such as a 2-OS TTI, 4-OS TTI, etc.). In some embodiments, the phrase "associated TTI" may also refer to a TTI in general. For example, some embodiments describe an ON/OFF time mask with respect its associated TTI. The time mask describes ramp up and/or ramp down transient periods with respect to the start and stop time of a TTI. Some embodiments may described an ON/OFF time mask with respect to a particular TTI. For example, an ON/OFF mask be determined in real time based on a current TTI and an adjacent TTI.

In particular embodiments, the determination of the masks is done based on TTI duration which depends on at least the TTI used by the UE for at least transmitting signals in its serving cell. The time mask may also be referred to as a reference mask or a mask reference (MASKref).

In some embodiments, the UE supports at least two TTIs and the UE can be configured with any of the supported TTIs for operating signals on at least one serving cell. Each TTI is associated with a mask. After determining the TTI to be used by the UE for operating signals in the serving cell, the UE selects a mask that is associated with the determined TTI. In general, the mask is a function of the TTI: mask=$f$(TTI).

In another example, the mask depends mainly on the TTI (TTIu) used in the uplink of the UE's serving cell: mask=$f1$(TTIu). In yet another example, the mask depends on both the TTI (TTIu) used in the uplink and the TTI (TTId) used in the downlink of the UE's serving cell: mask=$f2$(TTIu, TTId).

In carrier aggregation embodiments, a value of mask 1 and mask2 used for transmitting uplink signals S1 in a first cell and uplink signals S2 in a second cell, respectively, is a function of TTI used by the UE in the uplink of the first cell. This may be expressed by the following: mask1=$f3$(TTI1) and mask2=$f4$(TTI2). The previous expression can be generalized as: maskj=$f5$(TTIj).

In yet another example, the mask may depend on the TTI as well as the type of signals (Sg) transmitted by the UE in the serving cell both the TTI (TTIu) used in the uplink and the TTI (TTId) used in the downlink of the UE's serving cell. Examples of types of signals are SRS, DMRS, PUSCH, sPUSCH, PUCCH, sPUCCH, RACH, etc. The relation between mask, TTI and type of signal may be expressed below by: mask=$f6$(TTI, Sg), mask=$f7$(TTIu, Sg), and mask=$f8$(TTIu, TTId, Sg).

In general, some embodiments determine a first ON/OFF time mask by determining the ON/OFF time mask based on the configured TTI and a signal type of a wireless signal. In some embodiments, the signal type comprises a signal type of the wireless signal to be received. When the signal type of the wireless signal to be received includes a reference signal, determining the ON/OFF time mask may comprise determining an ON/OFF time mask where the ramp up and ramp down transient periods are positioned in time within the associated TTI. When the signal type of the wireless signal to be received includes user data, determining the ON/OFF time mask may comprise determining an ON/OFF time mask where the ramp up and ramp down transient periods are positioned in time outside of the associated TTI.

In particular embodiments, the signal type comprises a signal type of a wireless signal to be received in an adjacent TTI. When the signal type of the wireless signal to be received in an adjacent TTI includes a reference signal, determining the ON/OFF time mask may comprise determining a ON/OFF time mask where the ramp up and ramp down transient periods are positioned in time outside of the associated TTI. When the signal type of the wireless signal to be received in an adjacent TTI includes user data, determining the ON/OFF time mask may comprise determining a ON/OFF time mask where the ramp up and ramp down transient periods are positioned in time within the associated TTI.

As an example of some embodiments, a UE may use a first type of mask (mask1) for a first cell with TTI1, and the UE may use a second type of mask (mask2) for a second cell with TTI2. An example of mask1 and mask2 is illustrated in FIGS. 10A and 10B.

FIG. 10A is a timing diagram illustrating an ON/OFF time mask with the ramp up and ramp down transient periods positioned in time within the associated TTI, according to some embodiments. FIG. 10B is a timing diagram illustrating an ON/OFF time mask with the ramp up and ramp down transient periods positioned in time outside of the associated TTI, according to some embodiments. In other words, FIG. 10A illustrates a first type of mask when ramp up/down is inside the TTI boundary (similar to a legacy mask), and FIG. 10B illustrates a second type of mask when ramp up/down is outside the TTI duration.

For a TTI duration smaller than 1 ms (i.e., smaller than 14-OS TTI), the mask may be different than the mask used for 1 ms TTI. Note that 1 ms TTI comprises 14 OFDM symbols (with normal cyclic prefix length). An example of the different masks used for different TTIs is illustrated in Table 3 below.

TABLE 3

An example of masks as function of different TTIs

| TTI Pattern | TTI duration | Choice of mask |
|---|---|---|
| 14-OS | 1000 μs | First type of mask according to FIG. 10A |
| 7-OS | 500 μs | Second type of mask according to FIG. 10B |
| 4-OS | 285.71 μs | Second type of mask according to FIG. 10B |
| 2-OS | 142.86 μs | Second type of mask according to FIG. 10B |

In another example, the selection of masks may depend on a threshold value for TTI duration, such that: mask1=$f6$(TTI≥$\Delta_{\mu s}$) and mask2=$f7$(TTI<$\Delta_{\mu s}$). In general, some embodiments determine a first ON/OFF time mask by determining one ON/OFF time mask if a length of the obtained TTI is below a threshold, and determining a different ON/OFF time mask if the length of the obtained TTI is equal to or above the threshold.

The above formula can be expressed as the example shown in Table 4 below, if Δ=500 μs.

TABLE 4

A second example of masks as function of different TTIs

| TTI Pattern | TTI duration | Choice of mask |
|---|---|---|
| 14-OS | 1000 μs | First type of mask according to FIG. 10A |
| 7-OS | 500 μs | First type of mask according to FIG. 10A |
| 4-OS | 285.71 μs | Second type of mask according to FIG. 10B |
| 2-OS | 142.86 μs | Second type of mask according to FIG. 10B |

The table, relation mapping, or relating the values of TTI and the corresponding mask parameters can be obtained by the UE based on one or more of the following principles: (a) based on pre-defined rule (e.g., pre-defined requirement in a specification); (b) by receiving it from the network node or from another UE; (c) by autonomous selection by the UE (e.g., based on historical data or statistics); and (d) based on reception performance of uplink signals in a first cell (e.g., if received signal quality is below a threshold, then the UE may adjust its mask as a function of the TTI, that is adjustment may depend in the current TTI).

In some embodiments, the UE is scheduled across two consecutive TTIs. The UE may choose between any of the masks as shown in FIGS. 11A-11C.

Figure 11A:
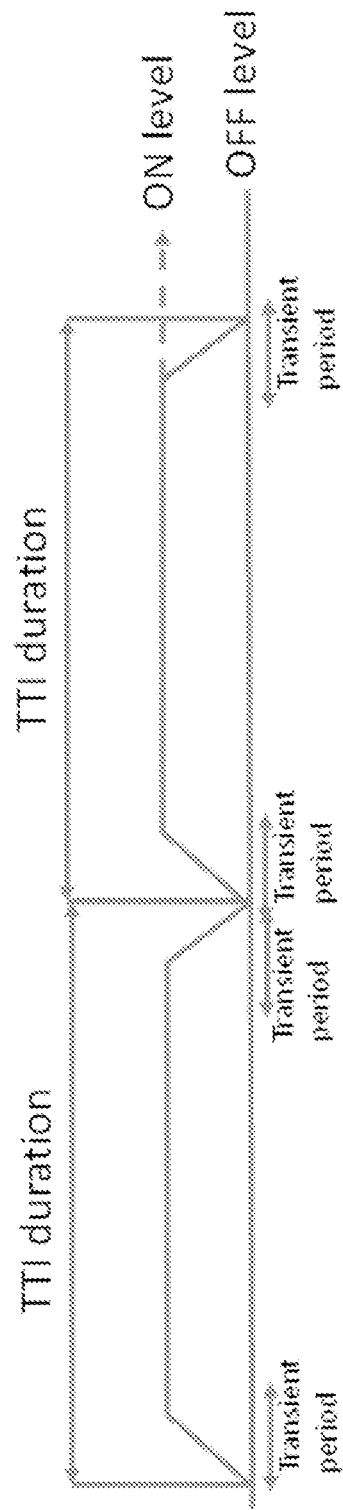
FIGS. 11A-11C are timing diagrams illustrating example ON/OFF time masks used for two or more consecutive TTIs, according to some embodiments.
Figure 11B:
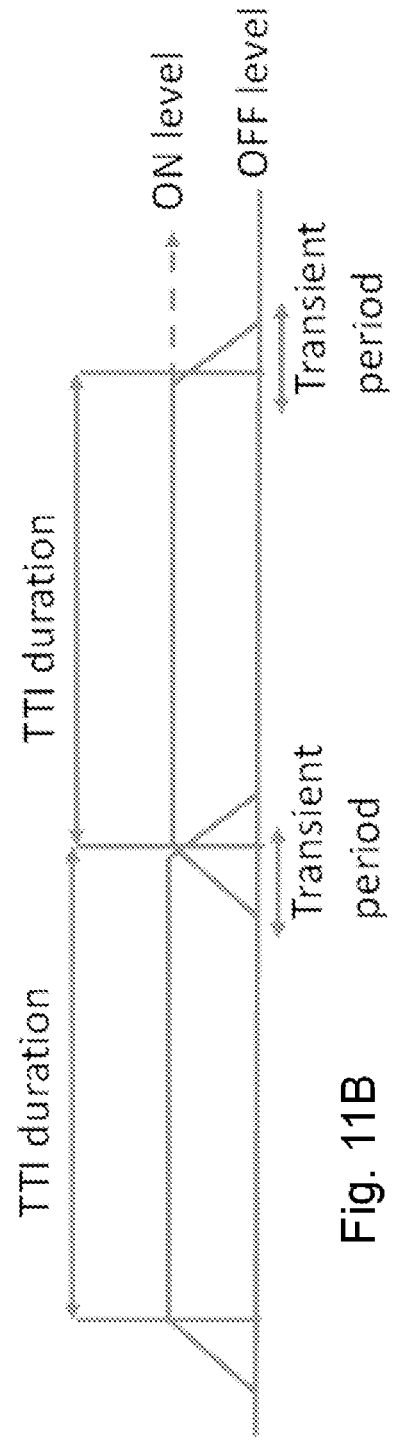
Figure 11C:
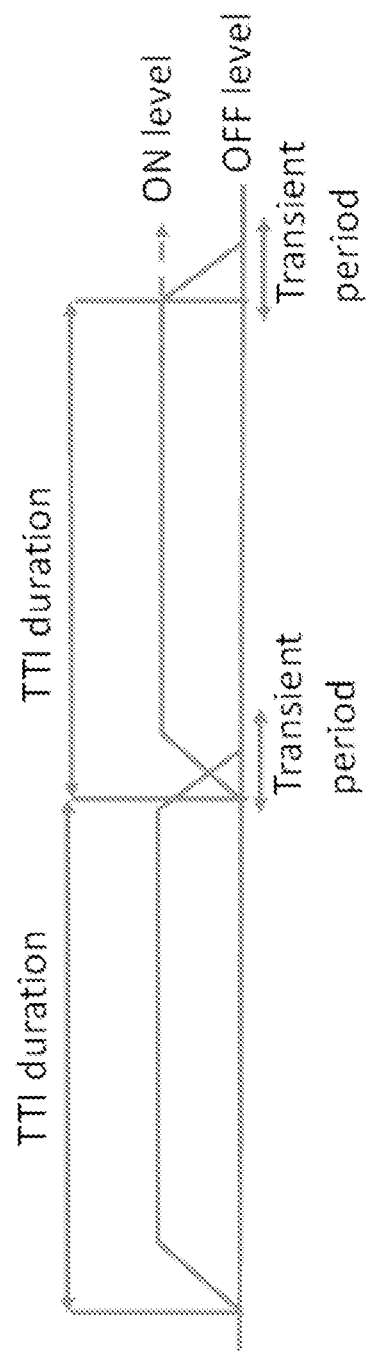

FIGS. 11A-11C are timing diagrams illustrating ON/OFF time masks used for two or more consecutive TTIs, according to some embodiments. FIG. 11A illustrates a third type of mask when UE is allocated uplink resources in consecutive TTIs. The ramp up and ramp down transient periods for each TTI are positioned in time within each TTI. FIG. 11B illustrates a fourth type of mask when the UE is allocated uplink resources in consecutive TTIs. The ramp up transient periods for each TTI are positioned in time outside of each TTI, and the ramp down transient periods for each TTI are positioned in time within each TTI. FIG. 11C shows a fifth type of mask when the UE is allocated uplink resources in consecutive TTIs. The ramp up transient periods for each TTI are positioned in time within each TTI, and the ramp down transient periods for each TTI are positioned in time outside of each TTI. An example of the different masks used for different TTIs when a UE is allocated resources in two consecutive TTIs is illustrated in Table 5 below.

TABLE 5

An example of masks as function of different TTIs when the UE is allocated resources across two consecutive TTIs

| TTI Pattern | TTI duration | Choice of mask |
|---|---|---|
| 14-OS | 1000 μs | Third type of mask according to FIG. 11(a) |
| 7-OS | 500 μs | Fourth or fifth type of mask according to FIG. 11(b) or (c) |
| 4-OS | 285.71 μs | Fourth or fifth type of mask according to FIG. 11(b) or (c) |
| 2-OS | 142.86 μs | Fourth or fifth type of mask according to FIG. 11(b) or (c) |

In another example, the selection of masks may depend on a threshold value for TTI duration, such that: Mask3=$f4$ (TTI≥$\Delta_{\mu s}$) and Mask4 or mask5=$f5$(TTI<$\Delta_{\mu s}$).

The above formula can be expressed as the example shown in Table 6 below, if Δ=500 μs.

TABLE 6

A second example of masks as function of different TTIs when the UE is allocated resources across two consecutive TTIs

| TTI Pattern | TTI duration | Choice of mask |
|---|---|---|
| 14-OS | 1000 μs | Third type of mask according to FIG. 11(a) |
| 7-OS | 500 μs | Third type of mask according to FIG. 11(a) |
| 4-OS | 285.71 μs | Fourth or fifth type of mask according to FIG. 11(a) or (c) |
| 2-OS | 142.86 μs | Fourth or fifth type of mask according to FIG. 11(b) or (c) |

In general, a plurality of ON/OFF time masks includes any of the following ON/OFF time masks: a ON/OFF time mask with the ramp up and ramp down transient periods positioned in time within the associated TTI; a ON/OFF time mask with the ramp up and ramp down transient periods positioned in time outside of the associated TTI; a ON/OFF time mask with the ramp up transient period positioned in time within the associated TTI and the ramp down transient period positioned in time outside of the associated TTI; and a ON/OFF time mask with the ramp up transient period positioned in time outside of the associated TTI and the ramp down transient period positioned in time within the associated TTI. The associated TTI for each of the plurality of ON/OFF time masks may comprise a plurality of consecutive TTIs. The configured first TTI may comprise at least one of an uplink TTI and a downlink TTI.

In yet another example embodiment, the UE decides not to ramp down and ramp up in between two consecutive TTIs, provided that one or more of the following is applicable: (a) uplink resources are allocated to the UE for more than one consecutive TTI; and (b) the resource allocation in frequency domain remains same for consecutive TTIs for the same UE. In these embodiments, the UE may choose to follow a sixth time mask as illustrated in FIGS. 12A and 12B.

Figure 12A:
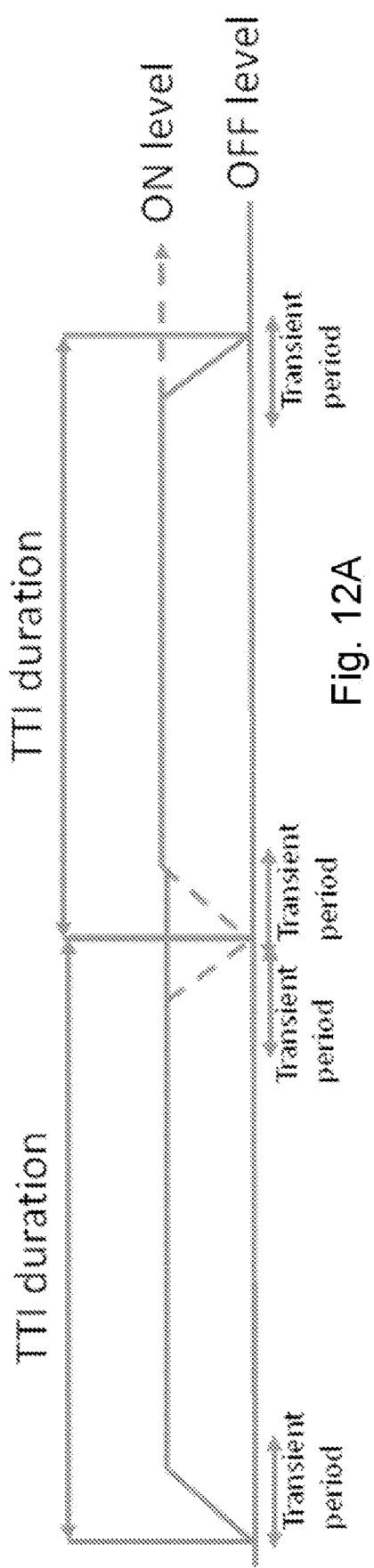
FIGS. 12A and 12B are timing diagrams illustrating another example of ON/OFF time masks used for consecutive TTIs, according to some embodiments.
Figure 12B:
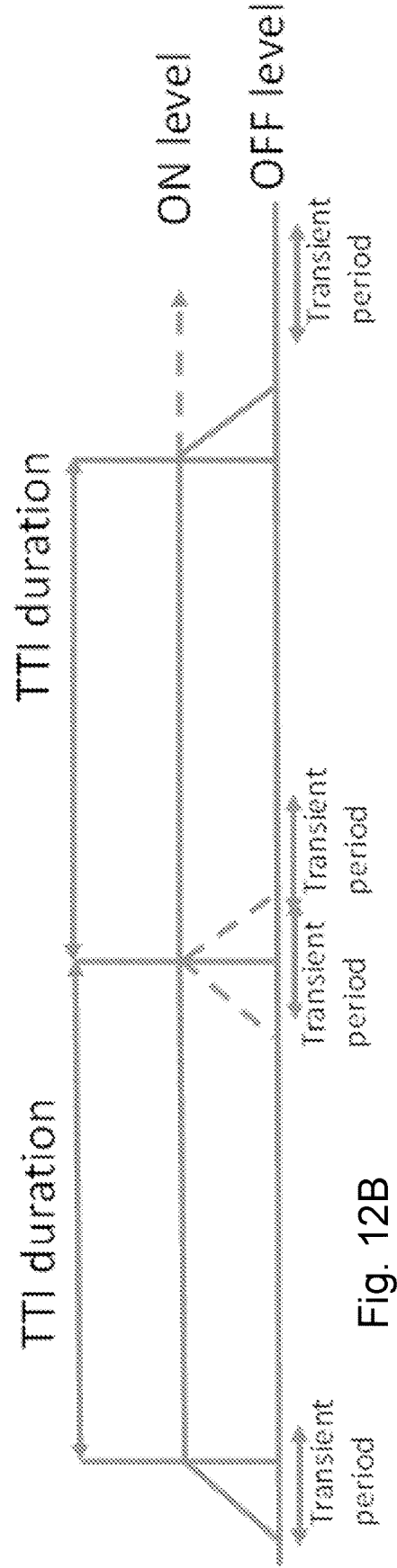

FIGS. 12A and 12B are timing diagrams illustrating another example of ON/OFF time masks used for consecutive TTIs, according to some embodiments. FIG. 12A illustrates a sixth type of mask with two consecutive TTIs, when the UE does not perform ramp down/up in between two TTIs, while the ramp up and ramp down at the sides of two consecutive TTIs are done within the TTI duration. A seventh type of mask, as described with respect to FIG. 12B, is similar to sixth type of mask except that the ramp up and ramp down at both of the two TTIs are done outside TTI boundary.

FIG. 13 is timing diagram illustrating an example of ON/OFF time masks used for overlapping consecutive TTIs, according to some embodiments. The dotted lines between two consecutive TTIs illustrate that if a large time mask (i.e., a mask that covers more than one TTI) is not used, then the UE will ramp down and ramp up immediately after that in the middle of two TTIs.

The example masks in FIGS. 11A-13 illustrate two consecutive TTIs. However, the concept of using a large time mask (i.e., a time mask that covers more than one TTI, such as the sixth or seventh masks) for more than two TTIs may be used when applicable. The number of TTIs for which a single time mask is used may be determined by the UE using any of the following methods: (a) UE may determine the number of TTIs for which it has consecutive uplink resource allocation (and same number of RBs are allocated to the UE for all these consecutive TTIs) from the uplink control information (UCI) that it receives in the downlink; (b) the number can be a pre-defined number, such as a maximum of three TTIs, for example; (c) the number can be determined based on a function which includes the TTI duration (e.g., for shorter TTI durations, the maximum allowed consecutive TTIs can be larger compared to larger TTI duration); and (d) the UE may receive the number from the network via network signaling.

In another example embodiment, a choice between the sixth and seventh type of masks may depend on TTI duration. For example: a possible set is shown below in Table 7.

TABLE 7

An example of masks as function of different TTIs when the UE is allocated resources across two consecutive TTIs

| TTI Pattern | TTI duration | Choice of mask |
|---|---|---|
| 14-OS | 1000 µs | Sixth type of mask according to FIG. 12(a) |
| 7-OS | 500 µs | Seventh type of mask according to FIG. 12(b) |
| 4-OS | 285.71 µs | Seventh type of mask according to FIG. 12(b) |
| 2-OS | 142.86 µs | Seventh type of mask according to FIG. 12(b) |

Other rules may also apply for choice of the masks between sixth and/or seventh type of masks, such as rules similar to Table 6.

In another example embodiment, the UE may choose any of the masks in FIGS. 11A-13, depending on whether the power control parameters, resource allocation, etc. are same for consecutive TTIs or not. An example combination is shown below:

| Constraints between two consecutive TTIs | Choice of masks |
|---|---|
| Power control and resource allocation related parameters are different for consecutive TTIs | Third or fourth or fifth mask as described in FIG. 11 |
| Power control and resource allocation related parameters are same (or similar) for consecutive TTIs | Sixth or seventh mask as described in FIG. 13 |

Figure 4:
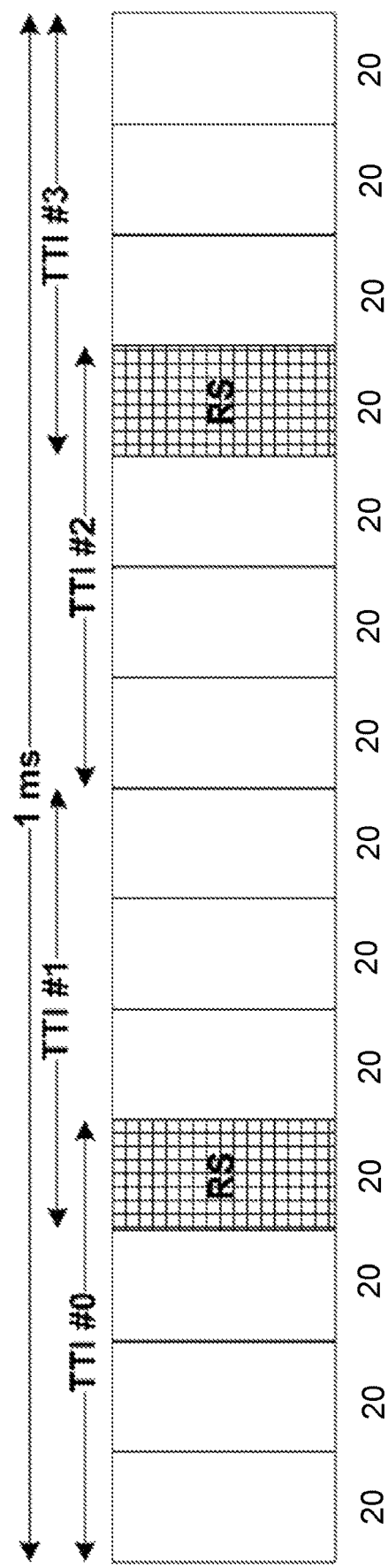
FIG. 4 illustrates an example of 4-symbol TTI.
Figure 5:
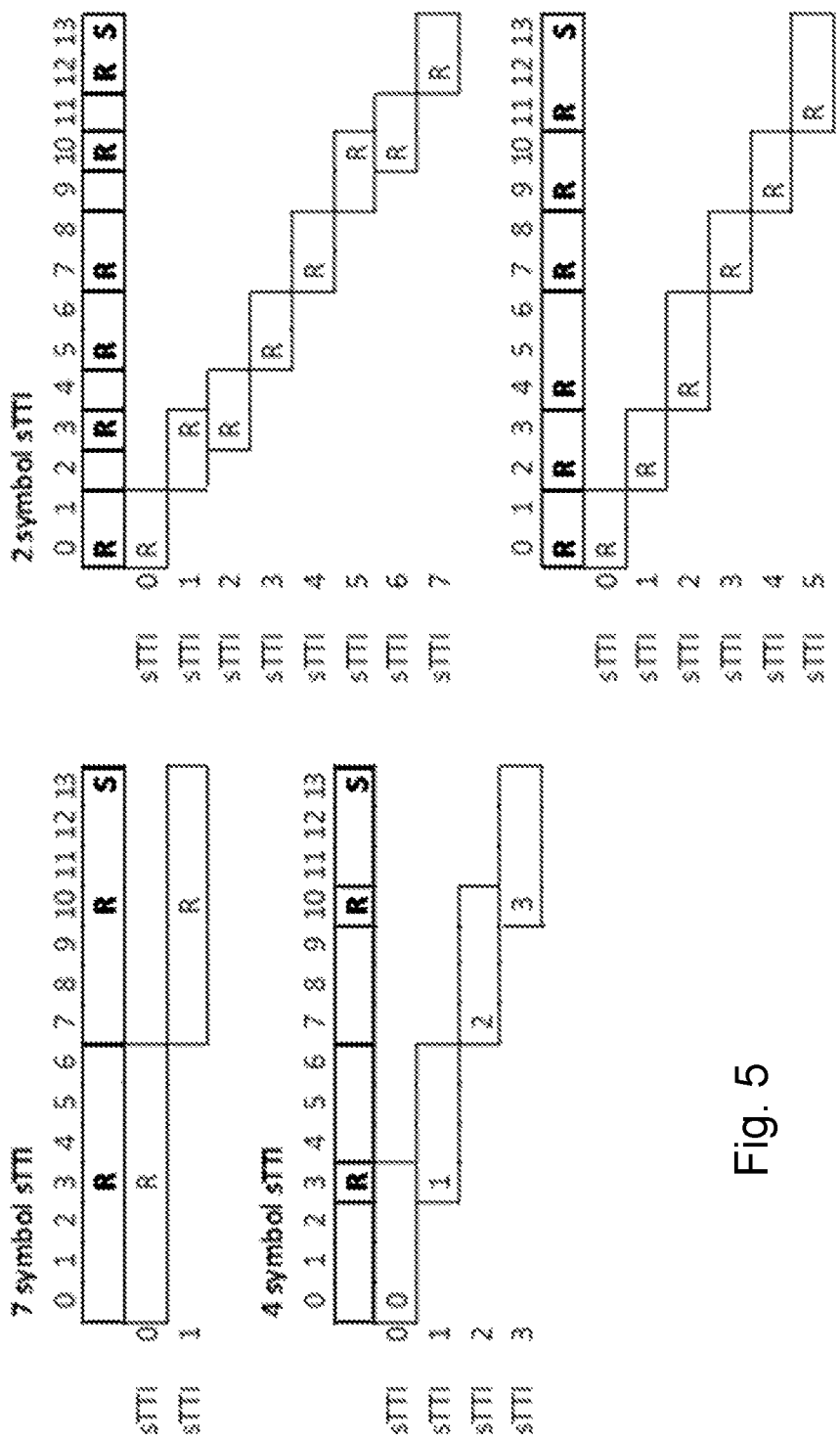
FIG. 5 illustrates examples of short TTI for uplink.
Figure 6:
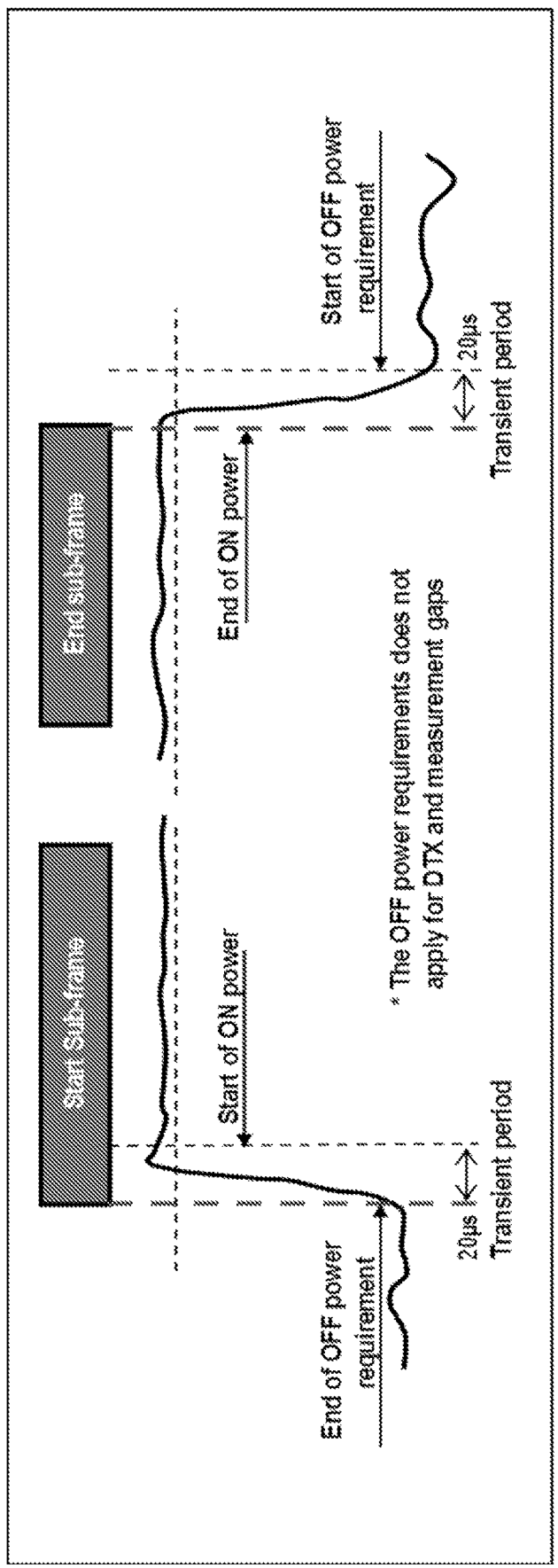
FIG. 6 illustrates an example ON/OFF time mask.
Figure 7:
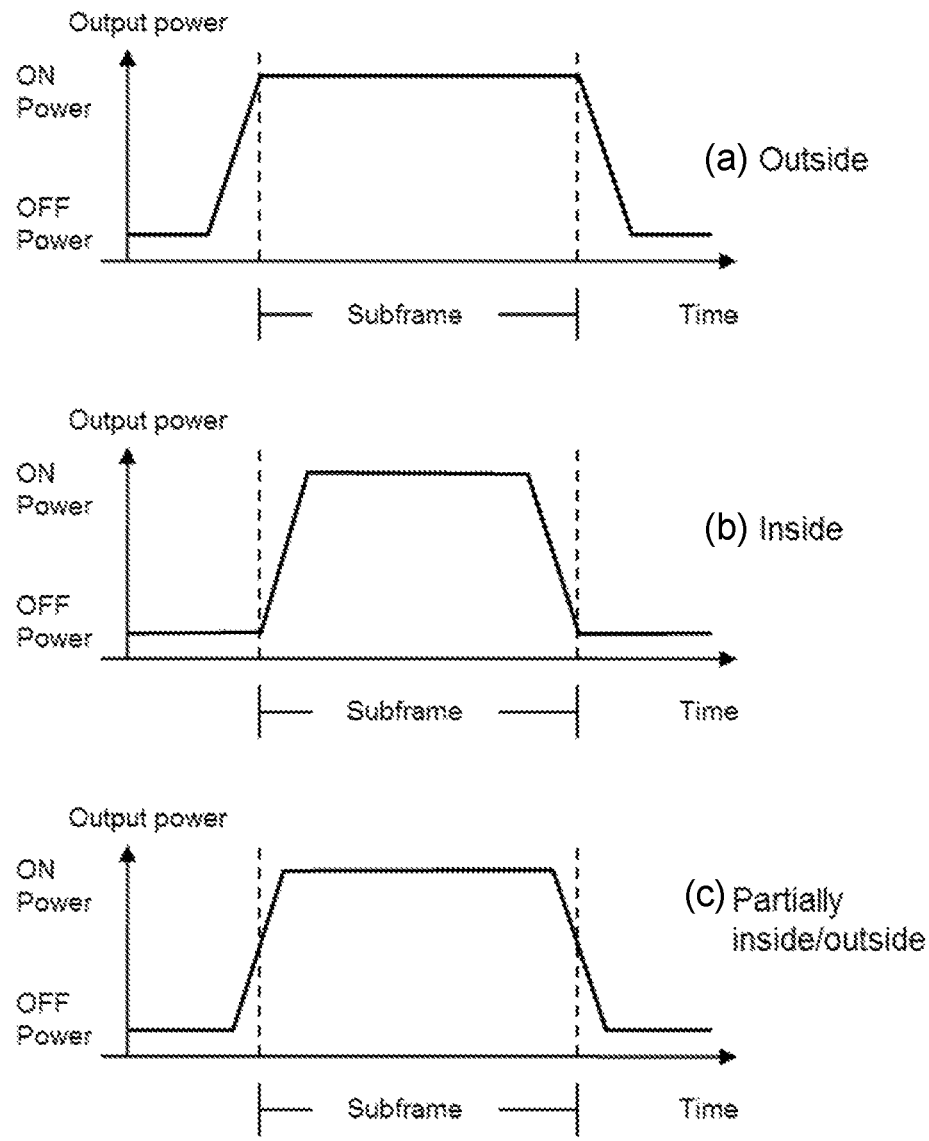
FIG. 7 illustrates three example positions in time for the power up and down transient periods.

In another example embodiment, when two consecutive TTIs overlap each other in time (and a UE is allocated resources in the overlapping consecutive TTIs), then the UE can use a large mask to cover both TTIs. This can happen when shortened TTI patterns, such as 4-OS TTI (as shown in FIG. 4), is used for any carrier, and when a UE is allocated uplink resources in two such consecutive 4-OS TTIs. The previous example is one example, other TTI combinations exists where the same can happen. In these cases, the UE can use one mask to cover both TTIs. An example mask is illustrated in FIG. 13.

In FIG. 13, introduced above, a large mask is used for two overlapping TTIs, while the overlapping symbol is a reference signal (e.g., DMRS) symbol. In another example, there may be more than one overlapping symbol containing reference signals (e.g., 2 DMRS symbols). In another example, the overlapping symbol(s) may contain any other uplink signal (e.g., SRS, data signal, control channel, etc.). In the illustrated embodiment, solid line masks represent individual TTIs, and dashed line mask represents the large common mask for both TTIs (i.e., one larger mask covers all symbols in the two consecutive TTIs).

In some embodiments, more than 2 TTIs may be included in the large mask if needed. An advantage of the larger mask covering both TTIs is that the overlapping symbol (or common symbol(s) such as DMRS) is not affected by the transients of the mask. This in turn ensures that the base station receiving the DMRS can demodulate it correctly and use it for channel estimation.

Returning to FIG. 9, the method continues to step 916. At step 916, the UE transmits the wireless signal in the cell according to the determined ON/OFF time mask. For example, wireless communications device 1105 transmits a wireless signal in cell 1115 according to the ON/OFF time mask determined in the previous step.

In some embodiments, the UE uses the determined masks (mask1 and/or mask2) associated with the determined value of TTI in the previous step for transmitting signals to the first cell. The UE, based on the determined masks, ensures that its ON/OFF behavior in the time window follows within the values described by mask1 and/or mask2. The UE, based on the determined value of mask1 and/or mask2 further ensures that its ON/OFF time window remains within the mask ranges when the TTI over which it transmits the signal is the same as when the mask was used by the UE.

Modifications, additions, or omissions may be made to method 900 illustrated in FIG. 9. Additionally, one or more steps in method 900 may be performed in parallel or in any suitable order.

Some embodiments include a method in a network node. In general, the method includes the following steps. Step-1: Configuring a UE with a first TTI (TTI1) used for operating a first signal between a first cell on a first carrier and the UE, and/or with a second TTI (TTI2) used for operating a second signal on a second carrier between a second cell and the UE. Step-2: Determining based on the determined values of TTI1 and TTI2, a first type of ON/OFF time mask (mask1) associated with a first TTI1 is to be selected or to be used by the UE for transmitting uplink signals and/or a second type of ON/OFF time mask (mask2) associated with a second TTI2 is to be selected or to be used by the UE for transmitting uplink signals. Step-3: Receiving the first signal in the first cell from the UE and/or the second signal in the second cell based on the determined ON/OFF time masks. Step-4: some embodiments include using the received signal and/or the determined masks for one or more operational tasks. An example method is illustrated in FIG. 14.

Figure 14:
FIG. 14 is a flow diagram of an example method in a network node, according to some embodiments.

FIG. 14 is a flow diagram of an example method in a network node, according to some embodiments. The method includes receiving wireless signals from a UE according to an ON/OFF time mask. In particular embodiments, one or more steps of method 1450 may be performed by radio access node 1110 of communication system 1100 described with reference to FIG. 8.

The method begins at step 1452, where the radio access node configures a UE with a TTI for operating a wireless signal between the UE and a cell. For example, radio access node 1110 may configure wireless communication device 1105 with a short TTI for operating a wireless signal between wireless communication device 1105 and cell 1115.

In particular embodiments, the network node configures a UE with first TTI (TTI1) used for operating a first signal (S1) between the network node and UE. The configuration of TTI1 may be performed by transmitting a message to UE (e.g., RRC message). Prior to configuration, the network node may determine the value of TTI1 or the need to configure TTI1 (i.e., specific value).

In addition, the network node configures the UE with second TTI (TTI2) used for operating a second signal (S2) between the network node and UE. The configuration of TTI2 may be performed by transmitting a message to UE (e.g., RRC message). Prior to configuration, the network node may determine the value of TTI2 or the need to configure TTI2 (i.e., specific value).

The network node may determine the value of TTI1 and/or TTI2 based on, for example, one or more of the following principles: (a) UE capability whether it supports two or more different TTIs (e.g., TTI1=1 ms and TTI2=0.14 ms); (b) a required UE bit rate; (c) a round trip time (RTT) required to deliver data packet between UE and the network node (e.g., shorter TTI is used when shorter RTT is required); (d) a UE location with respect to the serving cell (e.g., shorter TTI may be used if the UE is closer to the serving cell, i.e., closer to the network node serving cell1).

At step 1454, the radio access node determines an ON/OFF time mask from a plurality of ON/OFF time masks based on the TTI. For example, radio access node 1110 may determine an ON/OFF time mask based on the TTI determined in the previous step.

In particular embodiments, the network node determines the usable masks (mask1 and/or mask2) based on the configured value of TTI1 and/or TTI2. The parameter mask 1 and/or mask2 are used by the UE for transmitting uplink signals in cell 1 and/or cell2.

The network node may determine the value of mask 1 and/or mask2 based on a relation or mapping between TTIs and the ON/OFF time masks. The mapping may contain two TTIs and the corresponding two types of the masks windows for estimating the corresponding ON/OFF time behavior. The network node may determine the type of masks using the same principles as described above in connection with step 914 of method 900 described with respect to FIG. 9.

At step 1456, the radio access node receives the wireless signal from the UE according to the determined ON/OFF time mask. For example, radio access node 1110 receives the wireless signal from wireless communication device 1105 according to the ON/OFF time mask from the previous step.

In particular embodiments, the network node receives a first signal from the UE in the first cell over the configured TTI1, wherein the UE transmit signal follows the mask (i.e., mask1). The network node may receive the seconds signal from the UE in the second cell over the configured TTI2, wherein the UE transmit signal follows the mask (i.e., mask2).

In some embodiments, the network node may adapt its receiver configuration base on the determined types of masks (i.e., mask1 and/or mask2).

At step 1458, the radio access node may use the received wireless signal or determined ON/OFF time mask for one or more operational tasks. For example, radio access node 1110 may perform any of the following operational tasks: (a) performing radio measurements in the network node; (b) adapting TTI of the UE in downlink and/or in uplink in the first cell and/or the second cell; (c) adapting TTI of the UE in the first cell and/or the second cell in different time resources; (d) power control operation of the UE in the first cell and/or the second cell; (e) scheduling of data or signal in the uplink and/or in the downlink of the first cell and/or the second cell; (f) adaptation of the receiver configuration of the base station receiving signals from the UE in the first cell and/or the second cell.

Modifications, additions, or omissions may be made to method 1450 illustrated in FIG. 14. Additionally, one or more steps in method 1450 may be performed in parallel or in any suitable order.

FIG. 15A is a block diagram illustrating an example embodiment of a wireless communication device. A wireless communication device 1200A comprises a processor 1205 (e.g., Central Processing Units (CPUs), Application Specific Integrated Circuits (ASICs), Field Programmable Gate Arrays (FPGAs), and/or the like), a memory 1210, a transceiver 1215, and an antenna 1220. In certain embodiments, some or all of the functionality described as being provided by UEs, MTC or M2M devices, and/or any other types of wireless communication devices may be provided by the device processor executing instructions stored on a computer-readable medium, such as memory 1210. Alternative embodiments may include additional components beyond those shown in FIG. 15A that may be responsible for providing certain aspects of the device's functionality, including any of the functionality described herein.

FIG. 15B is a block diagram illustrating example components of a wireless communication device. A wireless communication device 1200B comprises at least one module 1225 configured to perform one or more corresponding functions. Examples of such functions include various method steps or combinations of method steps as described herein with reference to wireless communication device(s). In general, a module may comprise any suitable combination of software and/or hardware configured to perform the corresponding function. For instance, in some embodiments a module comprises software configured to perform a corresponding function when executed on an associated platform, such as that illustrated in FIG. 15A. Some embodiments include obtaining module 1250, determining module 1252, and transmitting module 1254.

Obtaining module 1250 may perform the obtaining functions of wireless communication device 1200A. For example, obtaining module 1250 may perform the obtaining functions of step 912 in FIG. 9. In certain embodiments, obtaining module 1250 may include or be included in processor 1205. In particular embodiments, obtaining module 1250 may communicate with determining module 1252, and transmitting module 1254.

Determining module 1252 may perform the determining functions of wireless communication device 1200A. For example, determining module 1252 may perform the determining functions of step 914 in FIG. 9. In certain embodiments, determining module 1252 may include or be included in processor 1205. In particular embodiments, determining module 1252 may communicate with obtaining module 1250 and transmitting module 1254.

Transmitting module 1254 may perform the transmitting functions of wireless communication device 1200A. For example, transmitting module 1254 may perform the transmitting functions of step 916 in FIG. 9. In certain embodiments, transmitting module 1254 may include or be included in processor 1205. In particular embodiments, transmitting module 1254 may communicate with obtaining module 1250 and determining module 1252.

Figure 16B:
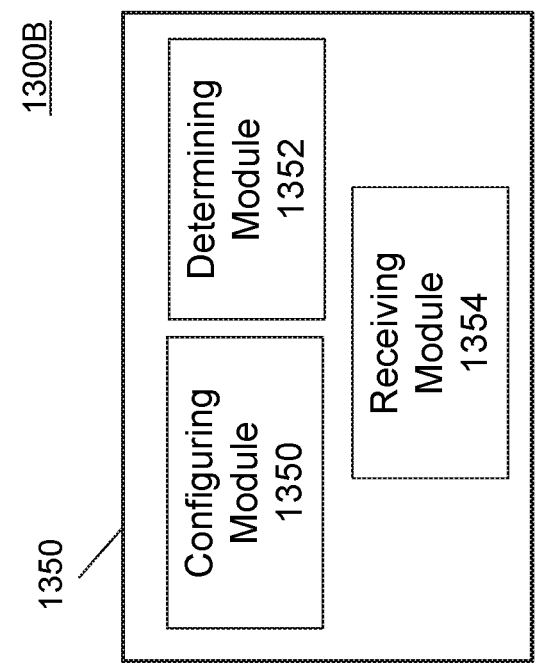
FIG. 16B is a block diagram illustrating example components of a radio access node.
Figure 16A:
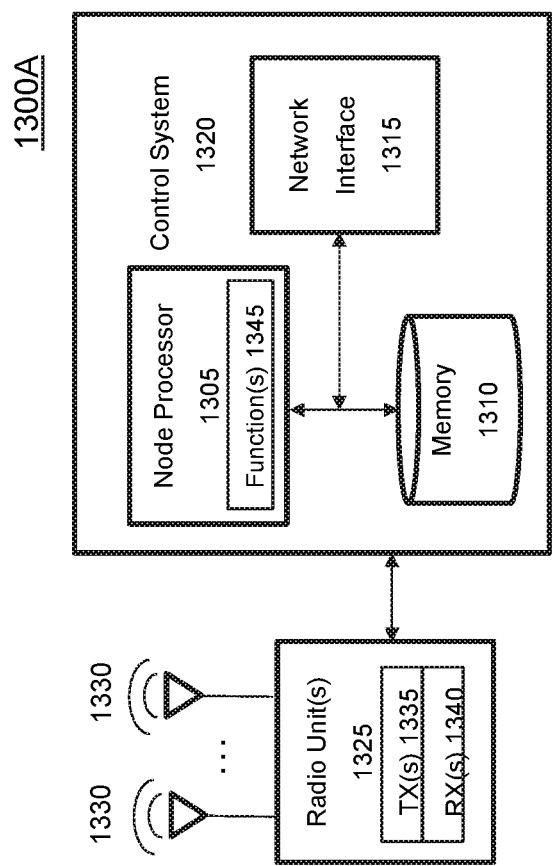
FIG. 16A is a block diagram illustrating an example embodiment of a radio access node.

FIG. 16A is a block diagram illustrating an example embodiment of a radio access node. Radio access node 1300A comprises a control system 1320 that comprises a node processor 1305 (e.g., Central Processing Units (CPUs), Application Specific Integrated Circuits (ASICs), Field Programmable Gate Arrays (FPGAs), and/or the like), memory 1310, and a network interface 1315. In addition, radio access node 1300A comprises at least one radio unit 1325 comprising at least one transmitter 1335 and at least one receiver 128 coupled to at least one antenna 1330. In some embodiments, radio unit 1325 is external to control system 1320 and connected to control system 1320 via, e.g., a wired connection (e.g., an optical cable). However, in some other embodiments, radio unit 1325 and potentially the antenna 1330 are integrated together with control system 1320. Node processor 1305 operates to provide at least one function 1345 of radio access node 1300A as described herein. In some embodiments, the function(s) are implemented in software that is stored, e.g., in the memory 1310 and executed by node processor 1305.

In certain embodiments, some or all of the functionality described as being provided by a base station, a node B, an enodeB, and/or any other type of network node may be provided by node processor 1305 executing instructions stored on a computer-readable medium, such as memory 1310 shown in FIG. 16A. Alternative embodiments of radio access node 1300 may comprise additional components to provide additional functionality, such as the functionality described herein and/or related supporting functionality.

FIG. 16B is a block diagram illustrating example components of a radio access node. Radio access node 1300B comprises at least one module 1350 configured to perform one or more corresponding functions. Examples of such functions include various method steps or combinations of method steps as described herein with reference to radio access node(s). In general, a module may comprise any suitable combination of software and/or hardware configured to perform the corresponding function. For instance, in some embodiments a module comprises software configured to perform a corresponding function when executed on an associated platform, such as that illustrated in FIG. 16A. Some embodiments include configuring module 1350, determining module 1352, and receiving module 1354.

Configuring module 1350 may perform the configuring functions of radio access node 1300A. For example, configuring module 1350 may perform the obtaining functions of step 1452 in FIG. 14. In certain embodiments, configuring module 1350 may include or be included in processor 1305. In particular embodiments, configuring module 1350 may communicate with determining module 1352 and receiving module 1354.

Determining module 1352 may perform the determining functions of radio access node 1300A. For example, determining module 1352 may perform the determining functions of step 1454 in FIG. 14. In certain embodiments, determining module 1352 may include or be included in processor 1305. In particular embodiments, determining module 1352 may communicate with configuring module 1350 and receiving module 1354.

Receiving module 1354 may perform the receiving functions of radio access node 1300A. For example, receiving module 1354 may perform the receiving functions of step 1456 in FIG. 14. In certain embodiments, receiving module 1354 may include or be included in processor 1305. In particular embodiments, receiving module 1354 may communicate with configuring module 1350 and determining module 1352.

FIG. 17 is a block diagram illustrating a virtualized example of a radio access node, according to some embodiments. The concepts described in relation to FIG. 17 may be similarly applied to other types of network nodes. Further, other types of network nodes may have similar virtualized architectures. As used herein, the term "virtualized radio access node" refers to an implementation of a radio access node in which at least a portion of the functionality of the radio access node is implemented as a virtual component(s) (e.g., via a virtual machine(s) executing on a physical processing node(s) in a network(s)).

Radio access node 1400 comprises control system 1320 as described in relation to FIG. 16A. Control system 1320 is connected to one or more processing nodes 1420 coupled to or included as part of a network(s) 1425 via network interface 1315. Each processing node 1420 comprises one or more processors 1405 (e.g., CPUs, ASICs, FPGAs, and/or the like), memory 1410, and a network interface 1415.

In this example, functions 1345 of radio access node 1300A described herein are implemented at the one or more processing nodes 1420 or distributed across control system 1320 and the one or more processing nodes 420 in any desired manner. In some embodiments, some or all of the functions 1345 of radio access node 1300A described herein are implemented as virtual components executed by one or more virtual machines implemented in a virtual environment(s) hosted by processing node(s) 1420. As will be appreciated by one of ordinary skill in the art, additional signaling or communication between processing node(s) 1420 and control system 1320 is used in order to carry out at least some of the desired functions 1345. As indicated by dotted lines, in some embodiments control system 1320 may be omitted, in which case the radio unit(s) 1325 communicate directly with the processing node(s) 1420 via an appropriate network interface(s).

In some embodiments, a computer program comprises instructions which, when executed by at least one processor, causes at least one processor to carry out the functionality of a radio access node (e.g., radio access node 1110 or 1300A) or another node (e.g., processing node 1420) implementing one or more of the functions of the radio access node in a virtual environment according to any of the embodiments described herein.

While the disclosed subject matter has been presented above with reference to various embodiments, it will be understood that various changes in form and details may be made to the described embodiments without departing from the overall scope of the disclosed subject matter.

Abbreviations

3GPP 3rd Generation Partnership Project
BLER Block Error Rate
CA Carrier Aggregation
CC Component Carrier
CFI Control Format Indicator
CN Core Network
DMRS Demodulation Reference Signal
DTX Discontinuous Transmission
eNB Evolved Node B
eNodeB Evolved Node B
FDD Frequency Division Duplex
IoT Internet of Things
LTE Long-Term Evolution
NR New Radio
NW Network
OFDM Orthogonal Frequency Division Multiplexing
PCC Primary Component Carrier
PCell Primary Cell
PCFICH Physical CFI Channel
PDCCH Physical Downlink Control Channel
PDSCH Physical Downlink Shared Channel
PUCCH Physical Uplink Control Channel
PUSCH Physical Uplink Shared Channel
PHICH Physical HARQ Indication Channel
PRB Physical Resource Block
RAT Radio Access Technology
RAN Radio Access Network
RRC Radio Resource Control
RSRP Reference Signal Received Power
RSRQ Reference Signal Received Quality
SCC Secondary Component Carrier
SCell Secondary Cell SC-FDMA Single-Carrier-Frequency-Division Multiple Access
SSF Short Subframe
sTTI short Transmission Time Interval
TDD Time Division Duplex
TTI Transmission Time Interval
UE User Equipment
UMTS Universal Mobile Telecommunications System

The invention claimed is:

1. A method for use in a user equipment (UE) of transmitting wireless signals according to an ON/OFF time mask, the method comprising:
   obtaining a first transmission time interval (TTI) for operating a first wireless signal between the UE and a cell;
   determining a first ON/OFF time mask from a plurality of ON/OFF time masks based on at least a length of the first TTI, wherein each ON/OFF time mask of the plurality of ON/OFF time masks specifies a length and position of transient periods for power ramp up and ramp down with respect to an associated TTI; and
   transmitting the first wireless signal in the cell according to the determined first ON/OFF time mask.

2. The method of claim 1, wherein the plurality of ON/OFF time masks includes any of the following ON/OFF time masks:
   an ON/OFF time mask with the ramp up and ramp down transient periods positioned in time within the associated TTI; and
   an ON/OFF time mask with the ramp up and ramp down transient periods positioned in time outside of the associated TTI.

3. The method of claim 2, wherein the associated TTI for each of the plurality of ON/OFF time masks comprises a plurality of consecutive TTIs.

4. The method of claim 1, wherein determining the first ON/OFF time mask is further based on a signal type of the first wireless signal.

5. The method of claim 4, wherein:
   when the signal type of the first wireless signal to be transmitted includes a reference signal, determining the first ON/OFF time mask comprises determining an ON/OFF time mask where the ramp up and ramp down transient periods are positioned in time within the associated TTI; and
   when the signal type of the first wireless signal to be transmitted includes user data, determining the first ON/OFF time mask comprises determining an ON/OFF time mask where the ramp up and ramp down transient periods are positioned in time outside of the associated TTI.

6. The method of claim 1, wherein determining the first ON/OFF time mask is further based on a signal type of a second wireless signal to be transmitted by the UE in an adjacent TTI.

7. The method of claim 6, wherein:
   when the signal type of the second wireless signal to be transmitted in the adjacent TTI includes a reference signal, determining the first ON/OFF time mask comprises determining an ON/OFF time mask where the ramp up and ramp down transient periods are positioned in time outside of the associated TTI; and
   when the signal type of the second wireless signal to be transmitted in the adjacent TTI includes user data, determining the first ON/OFF time mask comprises determining an ON/OFF time mask where the ramp up and ramp down transient periods are positioned in time within the associated TTI.

8. The method of claim 1, further comprising:
   obtaining a second TTI for operating a second wireless signal between the UE and the cell;
   determining a second ON/OFF time mask from the plurality of ON/OFF time masks based on the obtained second TTI; and
   transmitting the second wireless signal in the cell according to the second determined ON/OFF time mask.

9. A user equipment (UE) capable of transmitting wireless signals according to an ON/OFF time mask, the UE comprising a processor operable to:
   obtain a first transmission time interval (TTI) for operating a first wireless signal between the UE and a cell;
   determine a first ON/OFF time mask from a plurality of ON/OFF time masks based on at least a length of the first TTI, wherein each ON/OFF time mask of the plurality of ON/OFF time masks specifies a length and position of transient periods for power ramp up and ramp down with respect to an associated TTI; and
   transmit the first wireless signal in the cell according to the determined first ON/OFF time mask.

10. The UE of claim 9, wherein the plurality of ON/OFF time masks includes any of the following ON/OFF time masks:
    an ON/OFF time mask with the ramp up and ramp down transient periods positioned in time within the associated TTI;
    an ON/OFF time mask with the ramp up and ramp down transient periods positioned in time outside of the associated TTI;
    an ON/OFF time mask with the ramp up transient period positioned in time within the associated TTI and the ramp down transient period positioned in time outside of the associated TTI; and
    an ON/OFF time mask with the ramp up transient period positioned in time outside of the associated TTI and the ramp down transient period positioned in time within the associated TTI.

11. The UE of claim 10, wherein the associated TTI for each of the plurality of ON/OFF time masks comprises a plurality of consecutive TTIs.

12. The UE of claim 9, wherein the processor is operable to determine the first ON/OFF time mask by determining one ON/OFF time mask if the length of the first TTI is below a threshold, and determining a different ON/OFF time mask if the length of the first TTI is equal to or above the threshold.

13. The UE of claim 9, wherein the processor is operable to determine the first ON/OFF time mask further based on a signal type of the first wireless signal.

14. The UE of claim 13, wherein:
    when the signal type of the first wireless signal to be transmitted includes a reference signal, the processor is operable to determine the first ON/OFF time mask by determining an ON/OFF time mask where the ramp up and ramp down transient periods are positioned in time within the associated TTI; and
    when the signal type of the first wireless signal to be transmitted includes user data, the processor is operable to determine the first ON/OFF time mask by determining an ON/OFF time mask where the ramp up and ramp down transient periods are positioned in time outside of the associated TTI.

15. The UE of claim 9, wherein the processor is operable to determine the first ON/OFF time mask further based on a signal type of a second wireless signal to be transmitted by the UE in an adjacent TTI.

16. The UE of claim 15, wherein:
when the signal type of the second wireless signal to be transmitted in the adjacent TTI includes a reference signal, the processor is operable to determine the first ON/OFF time mask by determining an ON/OFF time mask where the ramp up and ramp down transient periods are positioned in time outside of the associated TTI; and
when the signal type of the second wireless signal to be transmitted in the adjacent TTI includes user data, the processor is operable to determine the first ON/OFF time mask by determining an ON/OFF time mask where the ramp up and ramp down transient periods are positioned in time within the associated TTI.

17. The UE of claim 9, wherein the processor is further operable to:
obtain a second TTI for operating a second wireless signal between the UE and the cell;
determine a second ON/OFF time mask from the plurality of ON/OFF time masks based on the obtained second TTI; and
transmit the second wireless signal in the cell according to the second determined ON/OFF time mask.

18. A method for use in a network node of receiving wireless signals from a user equipment (UE) according to an ON/OFF time mask, the method comprising:
configuring the UE with a first transmission time interval (TTI) for operating a first wireless signal between the UE and a cell;
determining a first ON/OFF time mask from a plurality of ON/OFF time masks based on at least a length of the first TTI, wherein each ON/OFF time mask of the plurality of ON/OFF time masks specifies a length and position of transient periods for power ramp up and ramp down with respect to an associated TTI; and
receiving the first wireless signal from the UE according to the determined first ON/OFF time mask.

19. The method of claim 18, wherein the plurality of ON/OFF time masks includes any of the following ON/OFF time masks:
an ON/OFF time mask with the ramp up and ramp down transient periods positioned in time within the associated TTI;
an ON/OFF time mask with the ramp up and ramp down transient periods positioned in time outside of the associated TTI;
an ON/OFF time mask with the ramp up transient period positioned in time within the associated TTI and the ramp down transient period positioned in time outside of the associated TTI; and
an ON/OFF time mask with the ramp up transient period positioned in time outside of the associated TTI and the ramp down transient period positioned in time within the associated TTI.

20. The method of claim 19, wherein the associated TTI for each of the plurality of ON/OFF time masks comprises a plurality of consecutive TTIs.

21. The method of claim 18, wherein the first TTI comprises at least one of an uplink TTI and a downlink TTI.

22. The method of claim 18, wherein determining the first ON/OFF time mask comprises determining one ON/OFF time mask if a length of the first TTI is below a threshold, and determining a different ON/OFF time mask if the length of the first TTI is equal to or above the threshold.

23. The method of claim 18, wherein determining the first ON/OFF time mask is further based on a signal type of the first wireless signal.

24. The method of claim 23, wherein:
when the signal type of the first wireless signal to be received includes a reference signal, determining the first ON/OFF time mask comprises determining an ON/OFF time mask where the ramp up and ramp down transient periods are positioned in time within the associated TTI; and
when the signal type of the first wireless signal to be received includes user data, determining the first ON/OFF time mask comprises determining an ON/OFF time mask where the ramp up and ramp down transient periods are positioned in time outside of the associated TTI.

25. The method of claim 18, wherein determining the first ON/OFF time mask is further based on a signal type of a second wireless signal to be received by the network node in an adjacent TTI.

26. The method of claim 25, wherein:
when the signal type of the second wireless signal to be received in the adjacent TTI includes a reference signal, determining the first ON/OFF time mask comprises determining an ON/OFF time mask where the ramp up and ramp down transient periods are positioned in time outside of the associated TTI; and
when the signal type of the second wireless signal to be received in the adjacent TTI includes user data, determining the first ON/OFF time mask comprises determining an ON/OFF time mask where the ramp up and ramp down transient periods are positioned in time within the associated TTI.

27. The method of claim 18, further comprising:
configuring the UE with a second TTI for operating a second wireless signal between the UE and a cell;
determining a second ON/OFF time mask from the plurality of ON/OFF time masks based on the second TTI; and
receiving the second wireless signal from the UE according to the determined second ON/OFF time mask.

28. A network node capable of receiving wireless signals from a user equipment (UE) according to an ON/OFF time mask, the network node comprising processor operable to:
configure the UE with a first transmission time interval (TTI) for operating a first wireless signal between the UE and a cell;
determine a first ON/OFF time mask from a plurality of ON/OFF time masks based on at least a length of the first TTI, wherein each ON/OFF time mask of the plurality of ON/OFF time masks specifies a length and position of transient periods for power ramp up and ramp down with respect to an associated TTI; and
receive the first wireless signal from the UE according to the determined first ON/OFF time mask.

29. The network node of claim 28, wherein the plurality of ON/OFF time masks includes any of the following ON/OFF time masks:
an ON/OFF time mask with the ramp up and ramp down transient periods positioned in time within the associated TTI;
an ON/OFF time mask with the ramp up and ramp down transient periods positioned in time outside of the associated TTI;

an ON/OFF time mask with the ramp up transient period positioned in time within the associated TTI and the ramp down transient period positioned in time outside of the associated TTI; and an ON/OFF time mask with the ramp up transient period positioned in time outside of the associated TTI and the ramp down transient period positioned in time within the associated TTI.

30. The network node of claim 29, wherein the associated TTI for each of the plurality of ON/OFF time masks comprises a plurality of consecutive TTIs.

31. The network node of claim 28, wherein the processor is operable to determine the first ON/OFF time mask by determining one ON/OFF time mask if the length of the first TTI is below a threshold, and determining a different ON/OFF time mask if the length of the first TTI is equal to or above the threshold.

32. The network node of claim 28, wherein the processor is operable to determine the first ON/OFF time mask further based on a signal type of the first wireless signal.

33. The network node of claim 32, wherein:
when the signal type of the first wireless signal to be received includes a reference signal, the processor is operable to determine the first ON/OFF time mask by determining an ON/OFF time mask where the ramp up and ramp down transient periods are positioned in time within the associated TTI; and
when the signal type of the first wireless signal to be received includes user data, the processor is operable to determine the first ON/OFF time mask by determining an ON/OFF time mask where the ramp up and ramp down transient periods are positioned in time outside of the associated TTI.

34. The network node of claim 28, wherein the processor is operable to determine the first ON/OFF time mask further based on a signal type of a second wireless signal to be received by the network node in an adjacent TTI.

35. The network node of claim 34, wherein:
when the signal type of the second wireless signal to be received in the adjacent TTI includes a reference signal, the processor is operable to determine the first ON/OFF time mask by determining an ON/OFF time mask where the ramp up and ramp down transient periods are positioned in time outside of the associated TTI; and
when the signal type of the second wireless signal to be received in the adjacent TTI includes user data, the processor is operable to determine the first ON/OFF time mask by determining an ON/OFF time mask where the ramp up and ramp down transient periods are positioned in time within the associated TTI.

36. The network node of claim 28, wherein the processor is further operable to:
configure the UE with a second TTI for operating a second wireless signal between the UE and a cell;
determine a second ON/OFF time mask from the plurality of ON/OFF time masks based on the second TTI; and
receive the second wireless signal from the UE according to the determined second ON/OFF time mask.

* * * * *